Aug. 28, 1934.   W. S. GUBELMANN   1,971,680
MOTOR MECHANISM
Original Filed Sept. 19, 1912   7 Sheets-Sheet 1

INVENTOR.
WILLIAM S. GUBELMANN
BY
ATTORNEYS

Aug. 28, 1934.     W. S. GUBELMANN     1,971,680
MOTOR MECHANISM
Original Filed Sept. 19, 1912   7 Sheets-Sheet 2

INVENTOR.
WILLIAM S. GUBELMANN
BY
ATTORNEY.

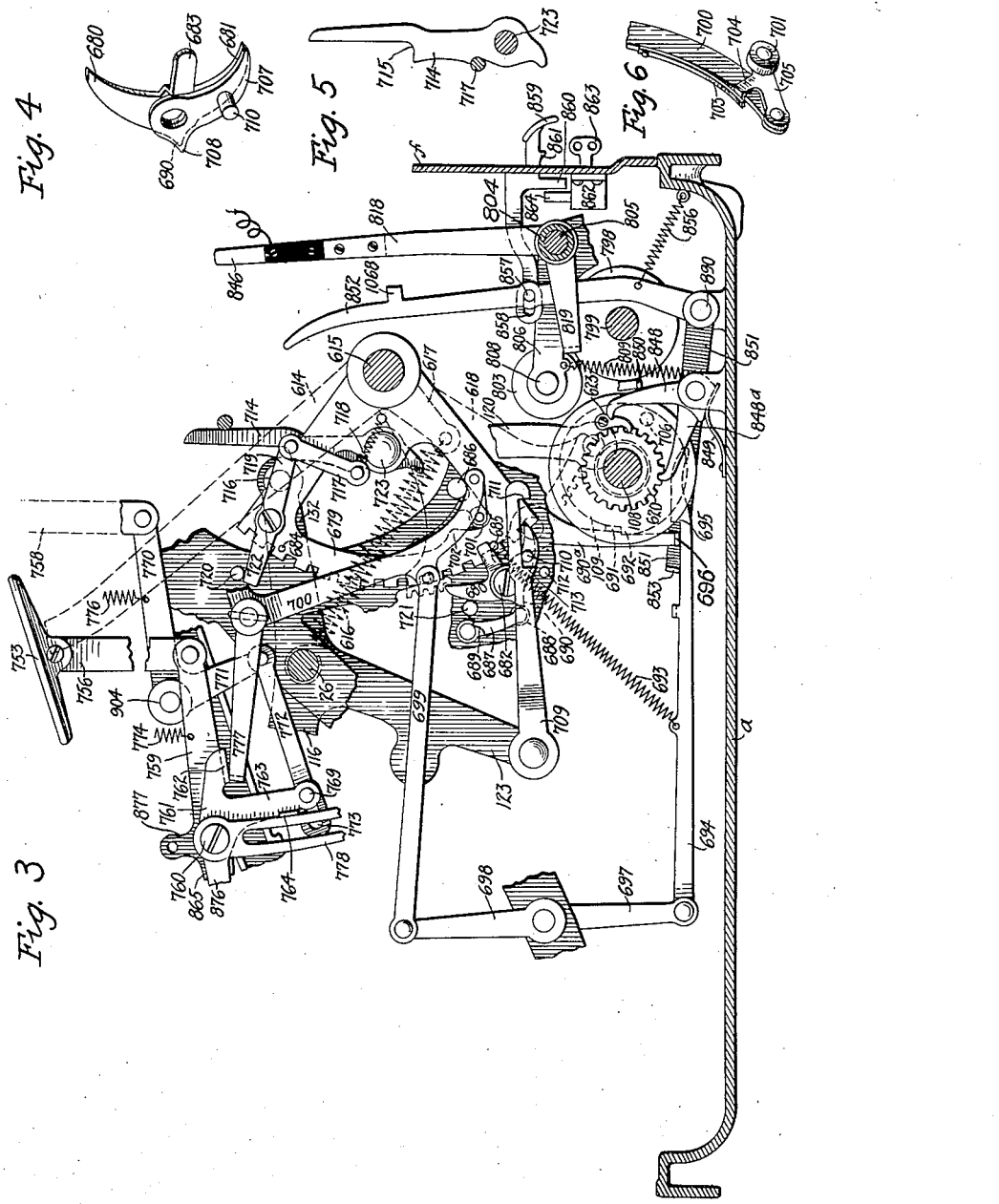

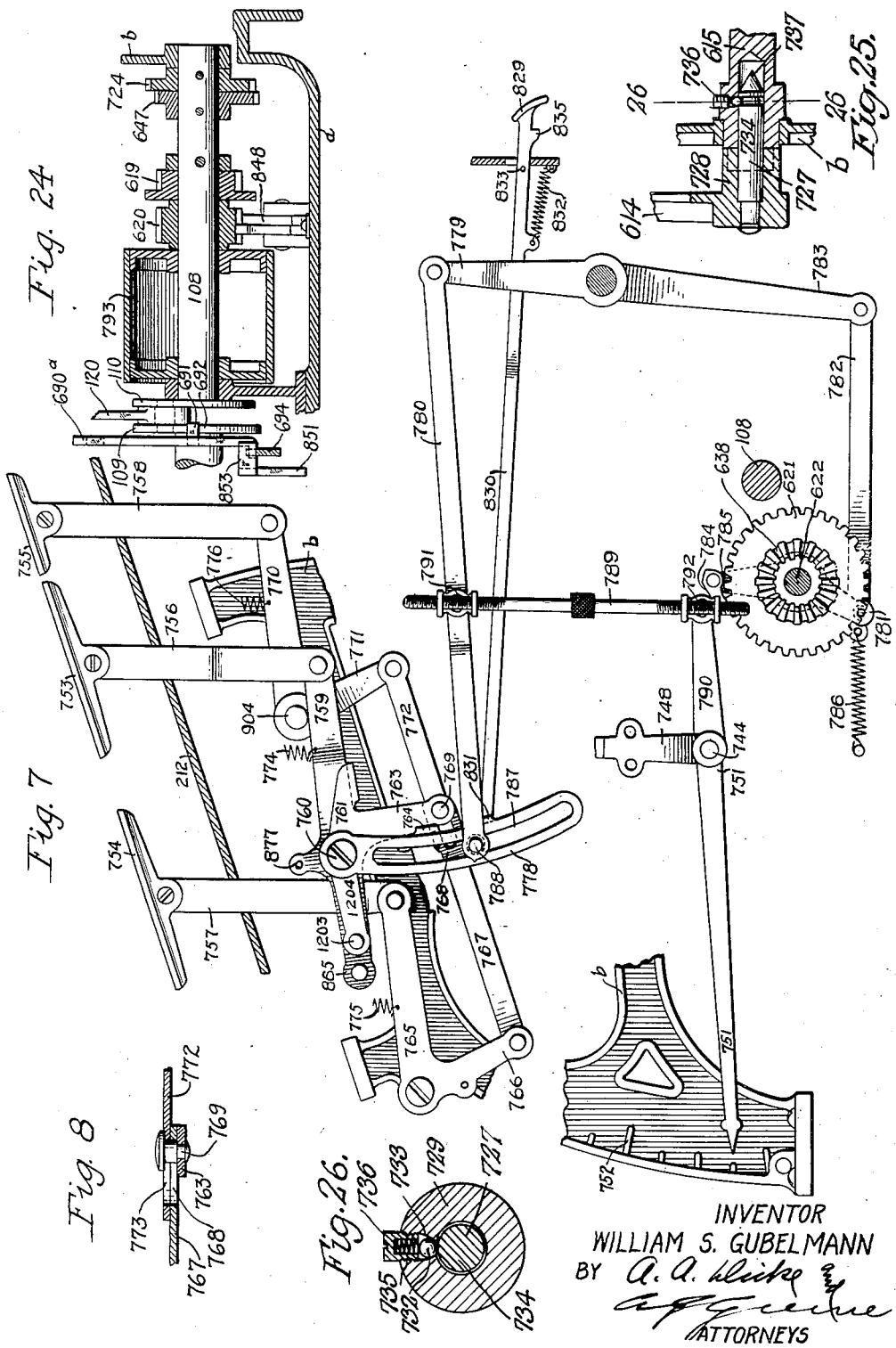

Aug. 28, 1934.  W. S. GUBELMANN  1,971,680
MOTOR MECHANISM
Original Filed Sept. 19, 1912   7 Sheets-Sheet 5

Inventor
WILLIAM S. GUBELMANN
BY
Attorneys

Aug. 28, 1934.  W. S. GUBELMANN  1,971,680
MOTOR MECHANISM
Original Filed Sept. 19, 1912   7 Sheets-Sheet 6
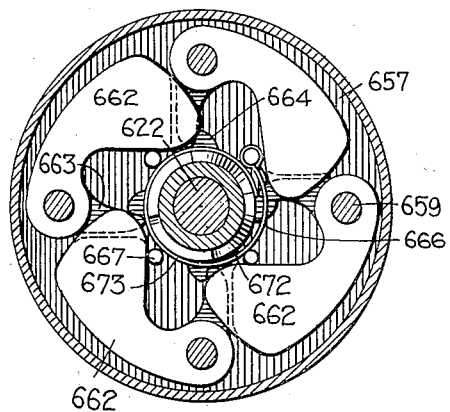
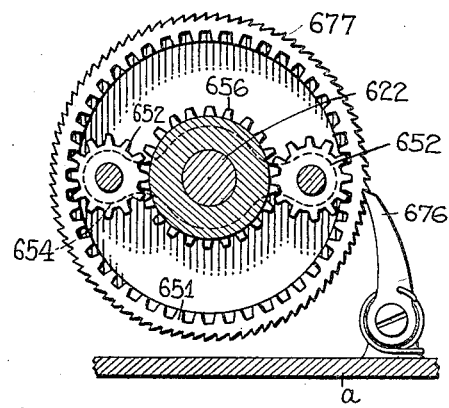
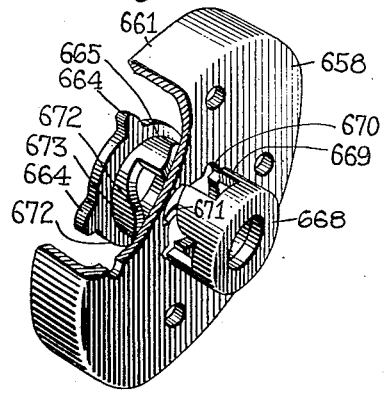
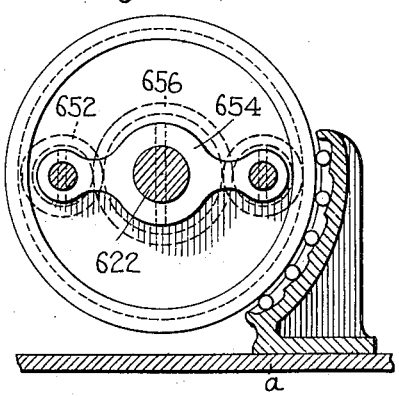
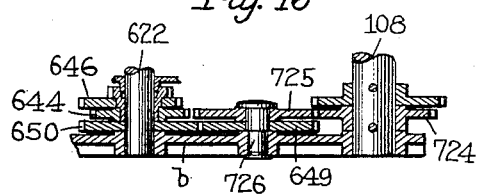
Inventor
WILLIAM S. GUBELMANN
By
Attorneys Aug. 28, 1934.  W. S. GUBELMANN  1,971,680
MOTOR MECHANISM
Original Filed Sept. 19, 1912  7 Sheets-Sheet 7
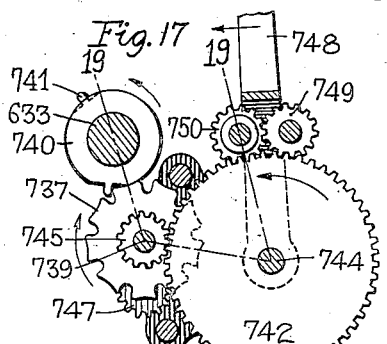
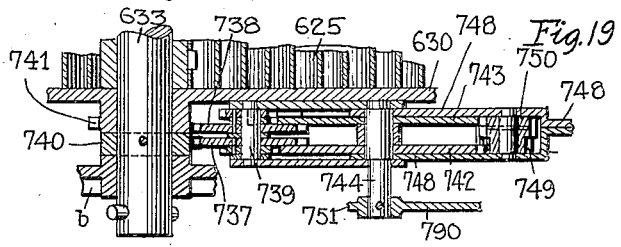
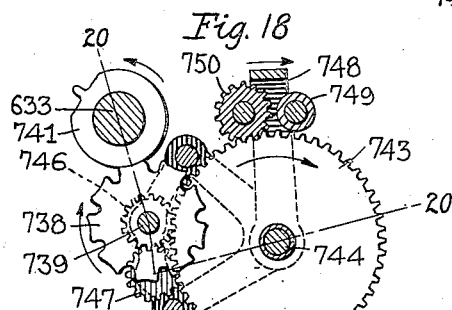
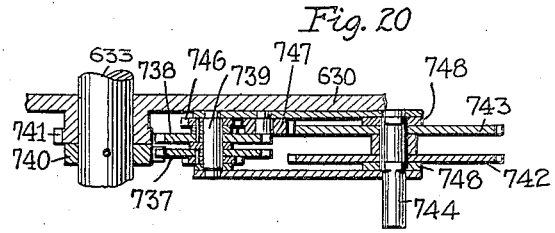
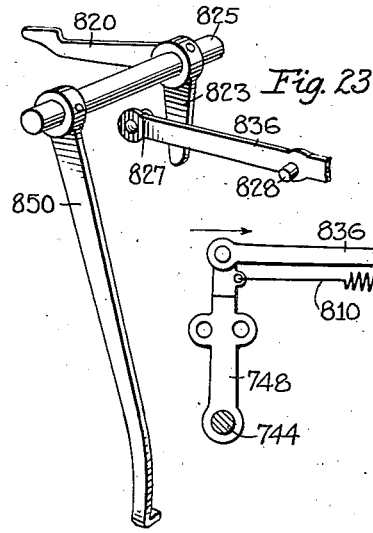
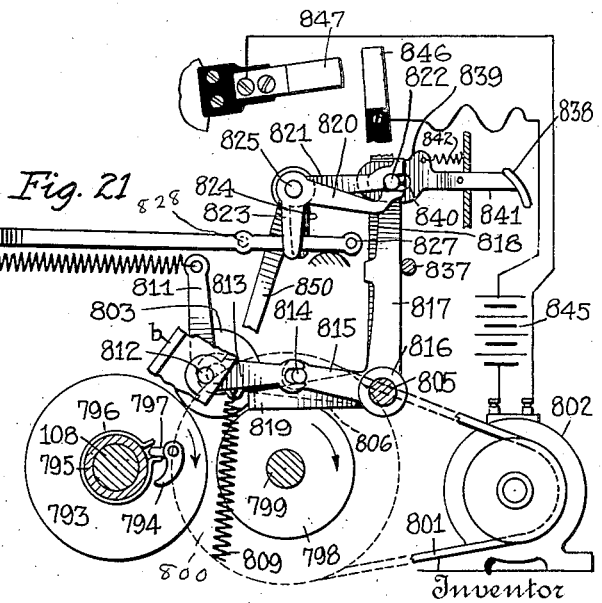
Inventor
WILLIAM S. GUBELMANN
By
Attorneys Patented Aug. 28, 1934

1,971,680

UNITED STATES PATENT OFFICE 1,971,680

MOTOR MECHANISM

William S. Gubelmann, Brooklyn, N. Y.

Original application September 19, 1912, Serial No. 721,141, now Patent No. 1,817,451, dated August 4, 1931. Divided and this application March 13, 1930, Serial No. 435,474

94 Claims. (Cl. 185—39)

This invention relates to motor mechanisms, particularly the type of mechanism in which power is applied to and stored in a spring device from which it is withdrawn as needed through suitable connections with the part or parts to be driven. The form of mechanism which has been illustrated in the drawings and will be hereinafter described is particularly adapted for use in connection with computing machines, especially a computing machine of the type shown in the present inventor's application Serial No. 721,141, filed September 19, 1912, now Patent No. 1,817,451, issued August 4, 1931, of which the present application is a division.

The object of the invention, stated in general terms, is to provide an improved spring motor mechanism, improved means for controlling the application of power thereto and the delivery of power therefrom, and an improved governing device operating in conjunction with the spring motor and the mechanism driven thereby.

More specifically, one of the objects of the invention is to provide means for applying power to a spring motor from a number of different sources.

A further object of the invention is to provide a latching device for the element driven by the spring motor, manipulative devices for effecting the release of said latching device, and means for applying to the spring motor any energy expended upon said manipulative devices in excess of that necessary to effect the release of the latching device.

A further object of the invention is to provide an operating lever which is capable of effecting the release of the driven element from the aforementioned latching device, and of applying power to the spring motor during a portion of its movement and to the mechanism driven by the spring motor during another part of its movement.

A further object of the invention is to provide an operating lever, a spring urging the lever in one direction, and means for applying the energy of this spring to the spring motor.

A further object of the invention is to provide means whereby said operating lever moves independently of the element which it drives during a part of its movement but is obliged to move with the driven element during another part of its movement.

A further object of the invention is to provide an improved power drive mechanism for the spring motor, with controlling means for automatically rendering the power drive mechanism effective and ineffective according to the condition of said motor, and an indicator for indicating the condition of said motor as to the amount of power stored therein.

A further object of the invention is to provide means for effecting a complete winding of the spring motor regardless of the aforementioned controlling means, and in connection therewith a safety appliance for preventing over-tensioning of the motor spring.

A further object of the invention is to provide an improved means for governing the speed of rotation of the driven mechanism.

A further object is to provide means for applying the energy of a centrifugal governor to the spring motor.

A further object is to provide connections between the spring motor and the driven mechanism whereby when the mechanism is started from rest a maximum torque is exerted thereon, and as the mechanism gains speed the torque is automatically decreased and its speed of rotation relative to the spring motor gear is increased.

A further object is to provide connections from the driven element to the governor such that upon the initial movement of the driven element the governor receives a maximum acceleration, and upon further movement of the driven element the speed of rotation of the governor relative to the rotation of said driving element is automatically and gradually diminished.

A further object is to provide a connection between the driven element and the governor such that the governor continues rotation after the driven element has been stopped, and in conjunction therewith means for applying the energy of such rotation to the spring motor.

A further object is to provide, in conjunction with the governor, an improved brake device.

A further object is to provide manipulative devices for releasing the driven element for movement by the spring motor and simultaneously applying the energy expended in the manipulation of such devices to the spring motor.

With these and other objects in view the invention consists in the novel combinations and arrangement of parts, a representative embodiment of which has been illustrated in the drawings and will be hereinafter more fully described.

In the drawings, Fig. 1 is a fragmentary side elevation of a computing machine according to the aforementioned parent application Serial No. 721,141, the right side of casing being removed.

Fig. 3 is a fragmentary longitudinal sectional elevation showing the operating lever and its connection to and control of the spring motor.

Fig. 4 is a perspective of a detent pawl for the operating handle segment.

Fig. 5 is a detached view of a pawl for coupling the operating lever segment to the main operating frame during the return movement of said segment.

Fig. 6 is a fragmentary perspective view showing the connection through which the operating lever or the operating keys operate upon the release mechanism for the main operating shaft.

Fig. 7 is a fragmentary longitudinal sectional elevation illustrating the winding of the motor spring by any of the operating keys, and the means for varying and preventing the winding effect of said keys.

Fig. 8 is a fragmentary horizontal section showing the common connection of the different operating keys to the motor winding devices.

Fig. 12 is a detached sectional elevation of the governor mechanism.

Fig. 13 is a fragmentary detached perspective of parts of the governor and brake control mechanisms.

Fig. 14 is a detached sectional elevation showing the governor driving gearing.

Fig. 15 is a view similar to Fig. 14 showing a modified form of detent device.

Fig. 16 is a section on the broken line 16—16 of Fig. 9.

Fig. 17 is a vertical longitudinal section showing the mechanism by which the indicator and electric motor control link are moved as the motor spring is being wound.

Fig. 18 is a vertical longitudinal section showing the parts by which the indicator arm and electric motor control link are moved as power is delivered from the spring motor.

Fig. 19 is a section on the broken line 19—19 of Fig. 17.

Fig. 20 is a section on the broken line 20—20 of Fig. 18.

Fig. 21 is a fragmentary longitudinal sectional elevation of the control mechanism associated with the electric motor.

Fig. 22 is a perspective of the key and associated parts by which the electric motor may be connected and started to wind the spring at any desired time, regardless of the tension of the spring.

Fig. 23 is a perspective of a part of the electric motor control devices with operating means for the lock which prevents over-winding of the spring motor.

Fig. 24 is a fragmentary vertical section of the main operating shaft.

Fig. 25 is a fragmentary transverse section showing the operating lever attaching means.

Fig. 26 is a section on the line 26—26 of Fig. 25.

*Spring motor driving means*

The spring motor is adapted to be driven or wound either from a source of power such as an electric motor or from a manually operated lever or from any one of a number of operating keys; the lever and the keys also functioning to release for operation the element which is driven by the spring motor, said element being in the present embodiment of the invention the main operating shaft of a computing machine. The hand-operated lever and parts associated therewith will be first described.

Figure 1:
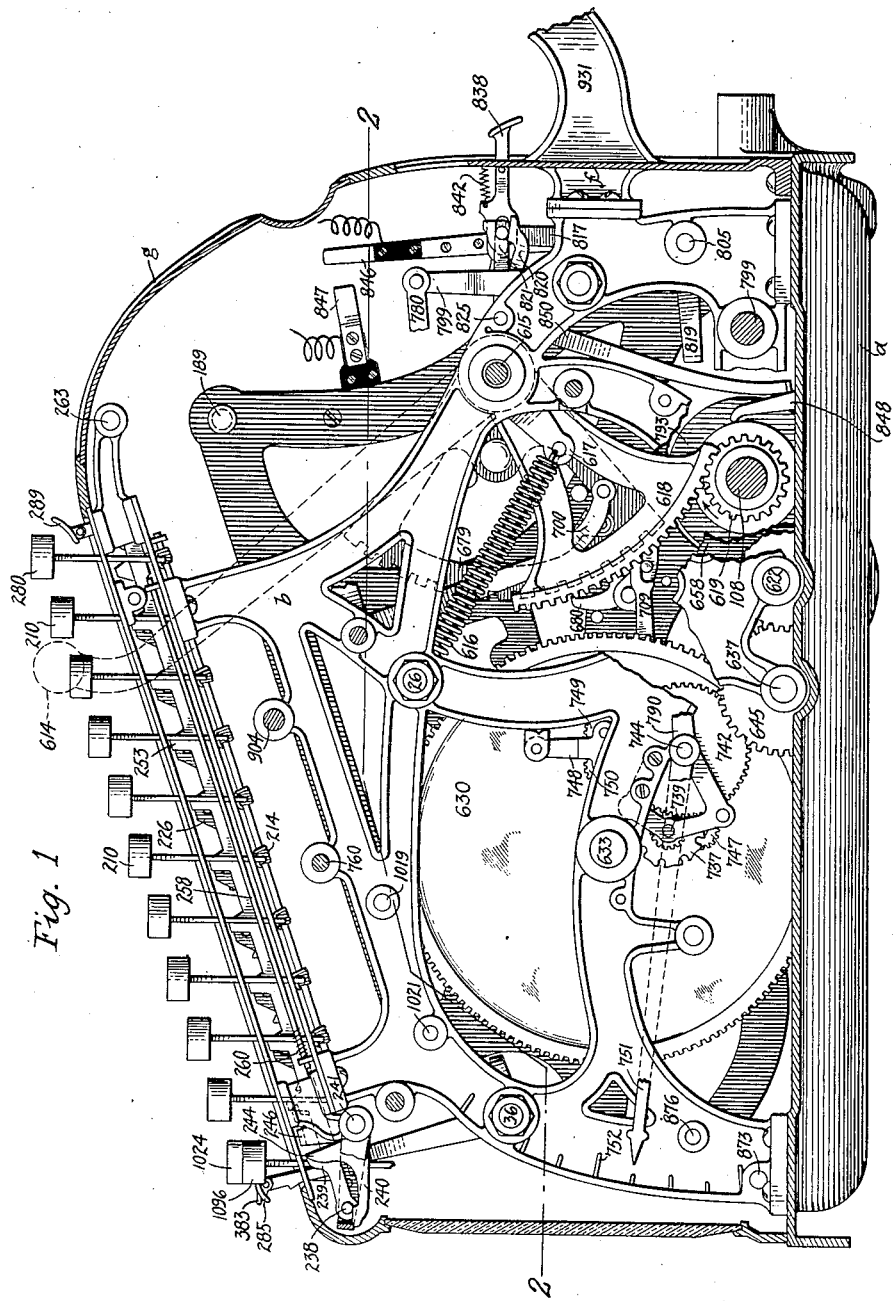
Figure 2:
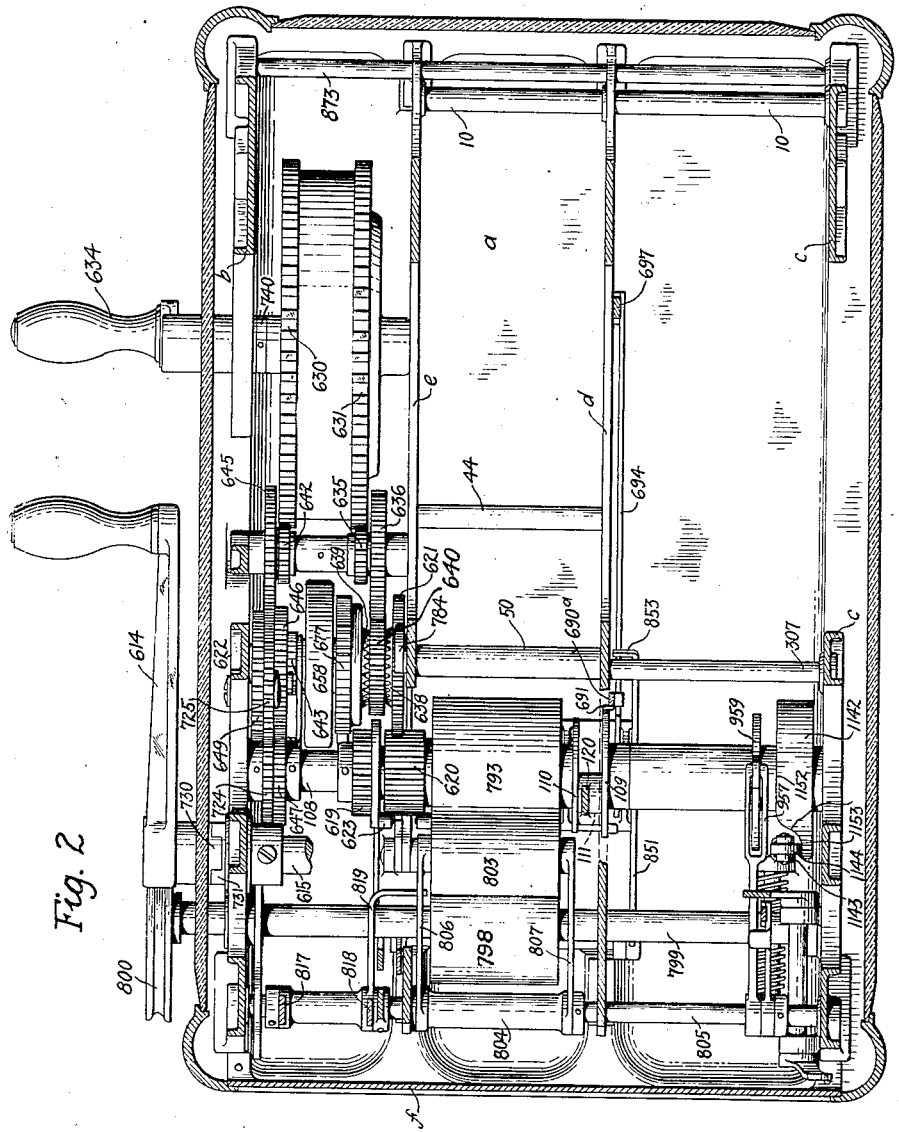
Fig. 2 is a fragmentary horizontal section substantially on the line 2—2 of Fig. 1.
Figure 9:
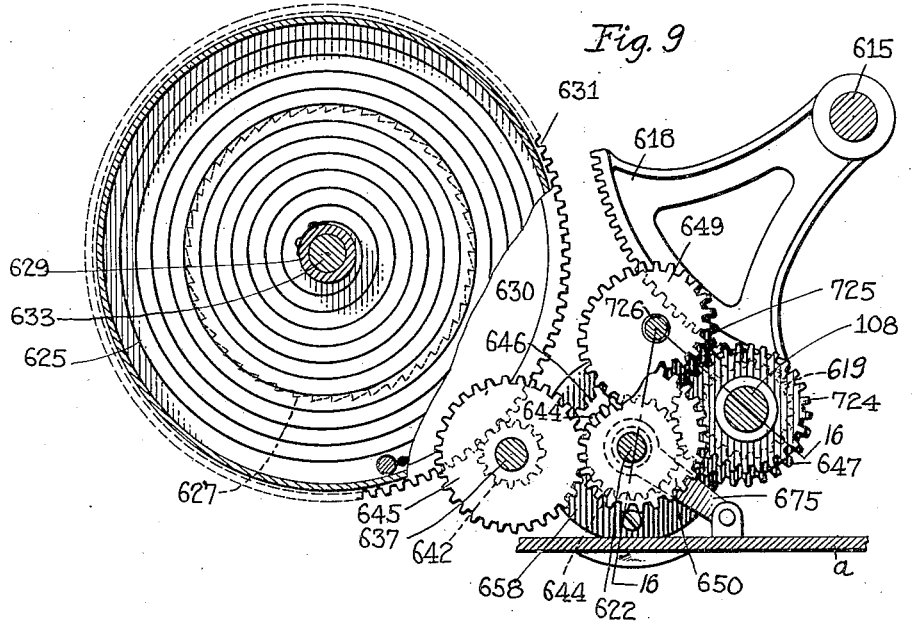
Fig. 9 is a fragmentary longitudinal sectional elevation of the spring motor and certain of its driving and driven elements.

614 (Figs. 1 and 3) represents the hand operating lever which is arranged at the right side of the machine and secured at its lower or rear end to a short horizontal rock shaft 615 which is journaled transversely on the main frames b and e.

This hand lever is turned forwardly by the hand of the operator, but the return or backward movement of the same is effected by a spring 616, which is connected at one end with a stationary part of the machine while its other end is connected with an arm 617 fixed to and extending from the rock shaft 615 of the hand lever 614.

To the rock shaft 615 is secured an operating gear segment 618 which meshes with an oscillating pinion 619 turning loosely on the main operating shaft 108, as shown in Figs. 1, 2, 3 and 9, and 10.

620 represents a gear wheel mounted loosely on the main operating shaft 108 adjacent to the pinion 619 and meshing with the gear wheel 621 which is mounted loosely on an intermediate shaft 622.

These gear wheels 620 and 621 turn in one direction only, deriving their movement from the oscillating pinion 619 by means of a pawl 623 mounted on said pinion 619 and adapted to engage with the teeth of the gear wheel 620. By this means the gear pinion during its forward movement is coupled with the gear wheels 620 and 621, but the later are uncoupled from the pinion and free to continue their forward movement while the pinion turns backwardly.

Figure 11:
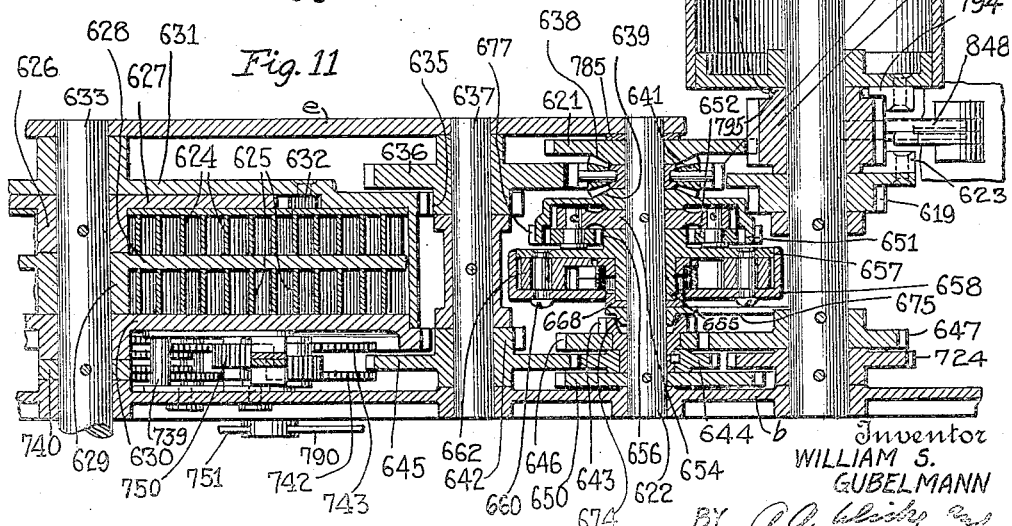
Fig. 11 is a horizontal section of the motor and associated parts.

A part of the driving mechanism consists of a spring motor which preferably comprises a plurality of coiled springs connected in series. A plurality of springs are preferred to a single very large spring, and furnish a more uniform torque. As shown in Fig. 11, two coil spring sections 624 and 625 are provided. The section 624 is connected at its inner end with the hub 626 of a winding ratchet wheel 627 and at its outer end with an intermediate disk 628. The second spring section 625 is connected at its inner end to the hub 629 of said intermediate disk and at its outer end to a transmitting gear wheel 630. Concentric with and adjacent to the ratchet wheel 627 is a winding gear 631, which carries a spring pressed ratchet pawl 632 adapted to engage the teeth of said winding ratchet wheel 627.

The gear wheels 630 and 631, the ratchet wheel 627 and the intermediate disk 628 are mounted on a motor shaft 633, the transmitting and winding gear wheels and the intermediate disk being loose thereon, while the winding ratchet wheel is secured thereto. By applying a crank 634 to the end of the motor shaft the spring may be rapidly wound up by hand, but for slow or automatic winding other means are provided which will be hereafter described.

The pawl interposed between the winding ratchet 627 and the winding gear 631 permits of turning the winding ratchet wheel forward directly by means of the said crank without interfering with the parts which wind the spring indirectly.

635 represents a pinion meshing with the winding gear wheel 631 and coupled with a gear wheel 636, said pinion and gear wheel being mounted loosely on an arbor or shaft 637. Gear 636 is driven by gear 621 (heretofore described as driven by the operating handle) through a compensating or differential gearing consisting of a bevel gear wheel 638, loose on the shaft 622 and secured to the gear wheel 621, a bevel gear wheel 639 facing the bevel wheel 638 and also loose on the shaft 622, a gear rim 640 meshing with the gear wheel 636 and arranged between the bevel wheels 638 and 639, and a plurality of bevel pinions 641 journaled radially on the inner side of the gear rim 640 and each meshing with both the bevel wheels 638 and 639.

The power stored in the spring motor is used to drive the operating shaft 108, one revolution at a time, and preferably with a maximum starting torque which gradually diminishes as said shaft rotates. For this purpose the connections from the spring motor to the shaft may be as follows:

642 (Figs. 9 and 11) represents a pinion mounted loosely on the shaft 637 and meshing with the transmitting gear 630 of the spring motor. 643 (Figs. 10 and 11) represents a ratchet wheel and 644 a gear pinion arranged on opposite ends of the same hub so as to turn together on the intermediate shaft 622. This last mentioned pinion 644 meshes with a gear wheel 645 which is secured to the pinion 642 which meshes with the transmitting gear wheel 630 of the spring motor. 646 and 647 (Figs. 2, 9, 10 and 11) represent a pair of cooperating scroll gears one of which is arranged between the ratchet wheel 643 and the pinion 644 and journalled on the hub connecting the same, while the other is secured to the main operating shaft 108.

Figure 10:
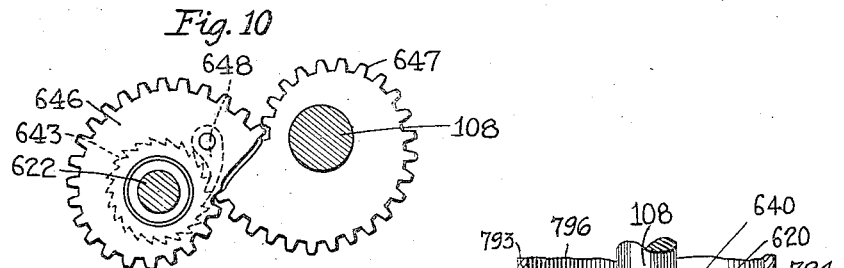
Fig. 10 is a detached elevation of the scroll gears forming a part of the gear train driven by the spring motor.

The driving scroll gear 646 and the ratchet wheel 643 are capable of being connected and disconnected, for a purpose hereinafter to be explained, by a spring pressed pawl 648 pivoted on the driving scroll gear 646 and meshing with the ratchet wheel 643 as shown in Fig. 10.

For regulating the speed of shaft 108 and returning to the spring motor the energy of the momentum of the driving mechanism when said shaft is suddenly stopped at the end of one revolution, the following mechanism is provided.

724 and 725 (Figs. 9 and 16) represent two intermediate gears the former being secured to the main shaft 108 and the latter being loosely mounted on the stud 726. 649 and 650 represent another pair of intermeshing scroll gear wheels the former of which is secured to the intermediate gear 725 and is mounted to revolve freely with said intermediate gear on the stud 726 while the latter of said wheels is secured to the intermediate shaft 622.

651 represents an internal gear rim formed and secured to the aforementioned bevel gear wheel 639, and 652 and 653 represent a plurality of planetary pinions meshing on their outer sides with the gear rim 651 and journaled on a disk or spider 654 which is secured to the intermediate shaft 622.

655 represents the hub of the governor body which is mounted loosely on the intermediate shaft 622 and provided at one end with a gear pinion 656 which meshes with the inner side of the planetary pinions 652 and 653.

657 and 658 (Figs. 11, 12 and 13) represent the two disks or sides of the governor body. Disk 657 is preferably formed integrally with the hub 655, while disk 658 is separable, being secured to the fixed disk by a plurality of transverse pins 659 and screws 660, and is provided with a peripheral flange 661 which engages with the outer edge of the fixed disk 657. 662 represents a plurality of governor weights arranged between the body disks 657 and 658 and each pivoted at its front end on one of the transverse pins 659 so as to be capable of swinging toward and from the axis of the governor body. At the pivot of each governor weight the same is provided with an inwardly projecting arm 663. These arms on the governor weights are engaged by the shoulders or lugs 664 on a sleeve 665 which is capable of oscillation on the hub 655 of the governor body. 666 represents a spring connecting said sleeve with the governor body and operating to constantly turn said sleeve in the direction of causing its shoulders 664 to draw the governor weights inwardly, the movement of the latter in this direction being limited by stops 667 on the governor body. 668 represents a shifting sleeve which is capable of axial movement on the governor or intermediate shaft 622, and is provided on one side with a plurality of teeth 669 which extend through openings 670 at the inner edge of the separable disk 658 of the governor body. The teeth 669 have inclined faces 671 at their ends which cooperate with corresponding inclined faces 672 of the teeth 673 on the adjacent end of the weight retracting sleeve 665. 674 represents a stop or clutch jaw mounted loosely on the governor shaft 622 and having a flat back, bearing against the shifting sleeve 668 and a conical front side bearing against a corresponding surface on the ratchet wheel 650, as shown in Fig. 11.

The clutch jaw 674 is secured to one end of a yielding supporting arm 675 which is secured to a stationary part of the machine. The shifting sleeve 668 is capable of slight axial movement but is compelled to turn with the governor body by engagement of its teeth with the sides of the openings 670 is the separable disk thereof, while the weight retracting sleeve is confined against axial movement by the disks of the governor body. Backward movement of the planetary gear rim 651 is prevented by a detent pawl 676 mounted on a fixed support and engaging with ratchet teeth 677 formed on the outer side of said rim.

Forward movement of the hand lever 614, which releases the main shaft 108 in a manner hereinafter described, is transmitted to and winds the motor spring 624, through oscillating pinion 619, gears 620 and 621, bevel gear 638, pinions 641, gear rim 640, gear 636, pinion 635, winding gear 631, pawl 632 and winding ratchet wheel 627.

If the bevel gear wheel 639 of the differential gearing is at rest while motion is being transmitted from the hand lever to the motor springs then the differential pinions 641 will roll around said bevel wheel and effect a reduction of one half in the speed of the motion which is being transmitted, with a corresponding gain in power.

The power stored in the spring motor is transmitted through the transmitting gear wheel 630 to the pinion 642, gear wheel 645, pinion 644, ratchet wheel 643, driving and driven scroll gears 646 and 647, to the main operating shaft 108 which latter is turned forward thereby. When the main operating shaft has made a complete turn the same is arrested as hereinafter described.

The power expended during each forward stroke of the hand lever is more than sufficient to produce a single turn of the main shaft so that the motor springs gradually become wound up and strained without the use of any other means for this purpose.

The pair of scroll gears 645-647 are so arranged that the greatest power or leverage of the spring motor is exerted at the beginning of the turning of the main shaft and this leverage is gradually reduced as the main shaft and the moving parts connected therewith gain momentum, thereby enabling the main shaft to be rapidly started by a comparatively light spring but avoiding unnecessary expenditure of power when it has gained momentum.

As the main shaft makes a rotation the governor shaft 622 is also rotated once, by means of the intermediate gears 724 and 725 and the second pair of scroll gears 649 and 650, whereby the governor body is rotated through the medium of the planetary pinions which roll around the gear rim 651 and cause the governor body to turn at double the speed in the same direction as the governor shaft, the gear rim being held from turning with the shaft by the ratchet pawl 676.

When the main operating shaft is stopped upon completing one revolution the governor shaft 622 and the spider 654 are also held stationary, and the governor body continues to rotate under its own momentum; and while the governor body thus turns independently of the governor shaft, the pivots of the planetary pinions are fixed, whereby the movement of the governor body is transmitted at reduced speed and in an opposite direction by the planetary pinions to the companion gear rim 651, the bevel gear wheel 639 and the differential pinions 641. Said pinions roll on the now stationary bevel gear wheel 638, and turn the differential gear rim 640 at another reduction of one half speed, the motion of said rim being transmitted through the gear wheel 636, pinion 635 and gear wheel 631 to the motor springs, whereby the latter are again wound up to the extent of the momentum energy of the rotating governor body.

The second pair of scroll gears 649 and 650 are so constructed that they exert their greatest leverage or power at the beginning of their movement for starting the rotation of the governor slowly after which the leverage gradually decreases as the momentum of the governor or fly wheel increases, accelerating or quickening the speed of the governor near the end of the turn of the main operating shaft, and relatively thereto.

By the use of this mechanism, including the connections from the governor body to the spring winding gearing, not only is the last part of each rotation of the main operating shaft retarded by a gradually increasing force and thereby cushioned so as to avoid hammering and undue noise and wear, but likewise the energy thus transmitted to the governor is utilized, inasmuch as much of the same is returned to the motor springs. If operations are effected on the machine in quick succession it is possible that the hand lever and governor may be turned at the same time, and the bevel gear wheels 638 and 639 turned simultaneously. The effect of this is merely to increase the speed of the differential gear rim 640 and the motor winding mechanism driven thereby.

When the main operating shaft is rotating at a normal speed the governor weights are retracted and the clutch jaw 674 is out of operative engagement with the ratchet wheel 643, as shown in Figs. 11 and 12. If however the speed of the operating shaft is above the normal, the governor weights throw out to such an extent that they turn the cam sleeve 665, causing its inclined teeth, by engaging those on the shifting sleeve 668, to move the latter sleeve axially and engage the clutch jaw with the ratchet wheel thereby holding the latter against turning. When this occurs the further unwinding of the motor springs and the expenditure of power from that source is arrested and the main operating shaft continues to turn under its momentum and the momentum of the governor and associated parts until its speed is reduced to normal, and the governor weights again retracted to release the ratchet wheel 643.

It will be seen that when the momentum of the operating shaft 108 is retarded during its rotation by an increase in the load on the same, the governor body, which is under motion, will through its connections with the operating shaft assist the latter in its forward motion, thus overcoming irregularity in the load during the working of the machine.

*Operating lever*

Means are provided which prevent backward movement of the operating lever 614 after the initial portion and prior to the completion of its forward movement, and for similarly controlling its backward or return movement.

These means are combined with other devices which prevent the operating lever from moving backward until the operating frame moves backward, and with further means whereby the backward pull of the operating lever is utilized to assist in moving the operating frame and connecting parts backwardly.

The mechanism shown in the drawings for accomplishing these purposes are constructed as follows:

679 (Figs. 1 and 3) represents a toothed detent segment which is secured to the operating shaft 615. 680 and 681 represent the two arms of a duplex detent pawl which project in opposite directions from the pin 682 by which they are pivotally secured to the frame adjacent to the rack of the detent segment.

Projecting laterally from the duplex detent pawl between its arms and extending along one side of the detent segment is a shifting arm 683, which is adapted to be engaged by either an upper tappet 684 or lower tappet 685 at opposite ends of the detent segment 679. The oscillating movement of the detent segment is limited by a stop 686, adapted to be engaged by upper and lower arms of the detent segment which act as shoulders for this purpose.

In the position of the parts shown in Fig. 3 the operating lever is in its rearmost position, in which the lower arm of the segment 679 engages the stop 686 and the duplex pawl is turned by the lower tappet 685 so as to engage the lower detent arm 681 with the foremost tooth of the detent segment.

The duplex detent pawl is yieldingly held in this position by means of a tension device consisting of a pivoted tension arm 687 having a roller 688, and a spring 689 operating to shift said arm so as to engage its roller with a trip or retaining lug or nose 690 on the central part of the duplex pawl. As shown in Figs. 3 and 4, the tension roller 688 bears against the rear side of the trip lug of the duplex detent pawl, thus holding the arm 681 of the same in engagement with the teeth of the detent segment.

Upon moving the operating lever forwardly while the parts are in this position the teeth of the detent segment will trip successively past the arm 681 of the duplex detent pawl, but the latter prevents backward movement of the operating lever and detent segment at this time.

During the last part of the forward movement of the detent segment its upper tappet 684 strikes the shifting arm 683 of the duplex detent pawl and turns the latter so that its arm 681 is disengaged from the teeth of the detent segment while the rear arm 680 of said pawl is engaged with said teeth.

Assuming that other conditions will not prevent it, the operating lever and detent segment may now be moved backward a complete stroke; any attempt to move the detent segment and operating lever forwardly after the backward stroke has been initiated being arrested by the rear arm of the duplex detent pawl.

At the end of the backward or return movement of the operating lever and detent segment the lower tappet on the latter engages the shifting arm 683 of the duplex detent pawl and turns the same so that its upper arm is disengaged from the detent segment and its lower arm is engaged therewith, preparatory to commencing the next forward stroke of the operating lever, as shown in Fig. 3.

While the machine is at rest the main shaft 108 is held against turning by a stop dog 690a having a shoulder 691 which is yieldingly held in engagement with a shoulder 692 on the stop disk 109 of the main shaft 108 by a spring 693, as shown in Figs. 3 and 24. During the first part of the forward stroke of the operating lever and detent segment the dog 690a is released from the shoulder 692, permitting the main shaft 108 to turn forwardly under the action of the spring motor, by mechanism which may be constructed as follows:

694 represents a releasing rod provided with a hook or shoulder 695 which is adapted to engage with a finger 696 on the stop dog 690a and disengage the same from the stop disk 109 of the main shaft.

This releasing rod is held in position by the spring 693 and is connected with the lower arm 697 of an upright intermediate rock lever.

The upper arm 698 of the latter is connected by a link 699 with a depending trip arm 700 which has a roller 701 at its lower free end, this roller is adapted to engage with a cam 702 on the detent segment.

In the normal or elevated position of the detent segment, the roller of the trip arm 700 (Figs. 3 and 6) engages with the low part of the cam 702, being held yieldingly in this position by a spring 703 connected with the upper arm 704 of an intermediate rock lever 705, whereby the shoulder 695 of the releasing bar or rod 694 is moved in rear of the stop dog 690a.

During the first part of the forward movement of the operating lever and detent segment the inclined part of the cam 702 by engaging with the roller 701 turns the rock arm 700 and lever 698 in the direction for moving the releasing bar 694 forwardly, whereby the shoulder 695 of the latter engages the stop dog 690a and disengages the same from the shoulder 692 of the stop disk 109, thereby permitting the main shaft 108 to turn forward under the action of the driving spring 624 and 625.

Immediately after the main shaft 108 commences to turn forwardly and the shoulder of the stop disk 109 has passed the shoulder of the dog 690a a pin or cam 706 on the stop disk 109 engages with the tail or rear end of the releasing bar 694 and depresses the same sufficiently to disengage its shoulder or hook 695 from the stop dog 690a.

The shoulder 691 of the latter is now drawn by the spring 693 against the periphery of the stop disk 109, ready to stop the same and the main shaft at the end of one rotation of these parts by engaging with the stop shoulder 692 of the stop disk.

The operating lever and detent segment upon completing their forward movement are prevented from moving backwardly until the operating frame also completes its forward movement. This is effected by means of an auxiliary detent pawl 707, which is arranged at the side of the front arm 681 of the duplex pawl and is yieldingly held in engagement with the same tooth of the detent segment by a trip lug 708 formed on the auxiliary detent pawl 707 and engaged by the roller 701 of the tension device, as shown in Fig. 3. 709 represents a shifting bar or hook pivoted on the operating frame and engaging its mouth with a pin 710 on the auxiliary detent pawl 707.

While the operating frame is making its forward stroke the auxiliary detent pawl engages with the detent segment, as shown in Fig. 3, and at the end of the forward stroke of the operating frame the rear shoulder 711 of the mouth of the hook engages with the pin 710 of the auxiliary detent pawl 707, and turns the same sufficiently to disengage it from the detent segment 679 at which time its trip lug 708 has been shifted to the opposite side of the tension roller, whereby the auxiliary detent pawl is held out of engagement from the detent segment.

The movement of the auxiliary detent pawl 707 away from the detent segment is limited by a stop 712 on the frame. This disengagement of the auxiliary detent pawl may occur before the detent segment has completed its forward movement, in which case the segment is still under control of the duplex detent and must complete its forward stroke before beginning the return stroke.

During the last part of the backward or return stroke of the operating frame 123 the front shoulder 713 (Fig. 3) of the shifting bar or hook 709 engages the pin 710 of the auxiliary detent pawl and turns the latter into engagement with the detent segment, bringing its trip lug 708 in front of the tension roller so that the latter again holds the auxiliary detent pawl yieldingly in its operative position.

Means are provided which permit the operating lever and detent segment to move forward independently of the operating frame, but which couple said lever and segment with the operating frame during the backward movement of these parts. This is effected by means of a coupling pawl 714 (Figs. 3 and 5) pivoted on the detent segment 679 and having a shoulder 715 which is adapted to move into and out of the path of a pin or shoulder 716 on the rear arm 132 of the operating frame, a presser finger 717, connected by a spring 718 with the detent segment, a rock lever having its rear arm 719 connected with said presser finger and pivoted on the detent segment, and upper and lower stops 720 and 721 on a stationary part of the machine and adapted to engage alternately with the front arm 722 of said rock lever and turn the same for causing the presser finger 714 to bear against the coupling pawl on one side or the other of its pivot 723.

As shown in Fig. 3, the presser finger bears against the coupling pawl above its pivot causing the same to be shifted rearwardly with its shoulder 715 out of engagement from the shoulder or pin 716 of the operating frame 132. The coupling pawl remains in this position until the detent segment is near the end of its forward stroke when the front arm 722 of the rock lever strikes the lower stop 721 and is turned thereby so as to shift the presser finger into engagement with the coupling pawl below its pivot. The instant this occurs the coupling pawl 714 is rocked into engagement with the shoulder 716 of the operating frame, the shoulder 715 of the coupling pawl 714 being below the shoulder 716.

If now the operating lever and segment are released and drawn upwardly by their return spring 616 the coupling pawl 714 will operatively connect said lever and segment with the operating frame so that the pull of the spring 616 will assist the operating frame in effecting its backward movement, and its excess energy will be returned to the main spring 624 and 625. The operating lever and detent segment can never move backward or return independently of the operating frame, the speed of which is controlled by the governor. Thereby an abrupt and noisy return of the operating lever and detent segment is prevented, and the energy of spring 616, which was stressed in the forward movement of the operating handle, is utilized.

Means are provided whereby the operating lever may be readily attached or detached for the purpose of permitting removal of the enclosing casing when access is desired to the internal mechanism, and also to prevent unauthorized persons from tampering with the machine. The means for this purpose, shown in Figs. 25 and 26, consist of a pin 727 arranged axially on the hub 728 of the operating lever 614 and adapted to enter a corresponding socket 729 in the end of the operating lever shaft 615, lugs 730 (Fig. 2) arranged on said hub and adapted to interlock with corresponding lugs 731 on the shaft 615, a spherical detent or ball 732 arranged in a radial pocket 733 in the shaft 615 and adapted to engage with an annular groove or seat 734 in the periphery of the pin 727, a spring 735 arranged in the pocket 733 and bearing at one end against the ball, and a cup shaped plug 736 screwed into the outer end of the socket and bearing against the outer side of the ball. By pulling outwardly on the hand lever 614 sufficiently to overcome the tension of the spring 735 the pin 727 may be withdrawn from the socket and the hand lever detached from the shaft. The inner end of the socket is contracted smaller than the diameter of the ball so that the latter cannot escape inwardly when the hand lever 614 is withdrawn. For the purpose of causing the pin 727 to gradually deflect the ball 732 upon pushing said pin into the socket the inner end 737 of the pin 727 is tapered, as shown in Fig. 25.

*Power driving indicating and regulating device*

Instead of winding the spring motor by hand the same may be operated by a power driving mechanism, which is preferably combined with a device which indicates the condition of the motor spring, and is also combined with an indicating device and a regulating device whereby the operation of the hand and power driving mechanism are automatically regulated.

This power driving indicating and regulating device illustrated in Figs. 1, 3 and 17 to 20 is secured to the frame b and is constructed as follows:—

737 and 738 represent two intermittent gear wheels which are pivoted loosely on the same arbor 739, and one of which meshes with a single tooth pinion 740 secured on the spring motor shaft 633, while the other meshes with a single tooth pinion 741 which is secured to the transmitting gear wheel 630 of the spring motor. 742 and 743 represent two master gear wheels which are loosely mounted side by side on a regulating rock shaft 744. 745 represents an intermediate gear pinion, meshing with the master gear wheel and secured to the intermittent gear wheel 737. 746 and 747 represent two intermeshing intermediate gear pinions one of which meshes with the master gear wheel 743 while the other is secured to the other intermittent gear wheel 738. 748 represents a regulating rock arm which is secured to the regulating rock shaft 744.

749 and 750 represent two intermeshing planetary compensating gear pinions which are pivoted on said regulating arm 748 and one of which meshes with the master gear wheel 742 while the other meshes with the master gear wheel 743. As the winding shaft of the spring motor is turned in the direction of the arrow (Fig. 17) for winding up the motor spring, the single tooth pinion 740 thereon turns the intermittent gear wheel 737 in the direction of the arrow and the intermediate gear 745 turns the master gear 742 in the direction of the arrow.

As the motor spring unwinds (Fig. 18) in operating the machine, the delivery or transmitting gear wheel 630 is turned in the same direction in which the winding shaft 633 moves while winding up the motor spring. This movement of the transmitting gear wheel 630 is transmitted by the single tooth pinion 741, intermittent gear wheel 738, and intermediate pinions 746 and 747 to the second master gear wheel 743, turning the same in a direction opposite to that in which the master gear wheel 742 is turned in winding the motor.

Ordinarily when the spring is being wound and the master wheel 742 turned in the direction of the arrow shown in Fig. 17, the companion master wheel 743 is stationary, and the movement of master wheel 742 causes the regulating arm to be carried in the direction of the arrow in Fig. 17. This is accomplished through the compensating pinions 749 and 750 one of which is rotated by the master wheel 742 while the other, meshing with the first, rolls around the stationary master gear wheel 743.

When the motor spring is unwound by the delivery of power therefrom, the master wheel 743 turns in the direction shown by the arrow in Fig. 18 while the master gear wheel 742 is stationary, and the movement of the regulating arm is reversed, that is its movement is opposite to that which takes place when the motor is being wound; since compensating gear pinion 750 is rotated by the master gear wheel 743, while the pinion 749 rolls around the master gear wheel 742, as shown in Fig. 18.

It will thus be seen that the regulating rock arm may be turned in either direction depending upon whether the motor spring is being wound up or is being unwound. If the motor spring is being wound up at the same rate as it is unwinding these two movements neutralize each other, since the two trains of gearing simply move equally in opposite directions without disturbing the position of the regulating arm.

Should the winding up and unwinding of the motor spring 624 and 625 occur at the same time but at different rates the two trains of gearing connecting the same with the regulating arm will adjust themselves to the difference and move the regulating arm in one direction or the other an amount equal to the difference between the winding up and unwinding movements.

When the regulating arm reaches the end of its movement in one direction the motor spring is fully wound up, and when the arm reaches the limit of its movement in the opposite direction the spring has been unwound as much as is permissible.

In order to show the condition of the motor spring the regulating arm 748 is provided with a pointer 751 (Figs. 1 and 3) which traverses a scale 752 on the frame b, thereby enabling the operator to detect whether the motor spring has run down and requires winding.

Operating keys

Instead of operating the machine by means of the operating lever the same may be operated by one of three operating keys 753, 754 and 755 (Fig. 7). Said keys may control functions of a machine, such as a computing machine, in the manner described in the parent application. As shown in Figs. 3 and 7 these keys are arranged in a longitudinal row at the right hand side of the machine, the main key 753 being in the middle of the row, the auxiliary key 754 at the front end of the row, and the repeating key 755 at the rear end of the row.

The shanks 756, 757 and 758 of the operating keys are guided in the top plate 212 of the machine at the right side thereof so as to be capable of vertical movement, but the same may be guided in any other suitable manner.

At its lower end the shank 756 of the main operating key 753 is connected with the rear arm 759 of a triple armed rock lever which is pivoted on a stud 760 on the frame b.

Pivoted on this stud adjacent to the rock arm 759 is an intermediate or lower triple armed rock lever having a rearwardly projecting arm 761, provided with a finger 762 which normally bears loosely against the under side of the rock arm 759, and a depending arm 763 provided with a lug or shoulder 764, as shown in Figs. 3 and 7.

The lower end of the shank 757 of the auxiliary operating key 754 is connected with the upper rearwardly projecting arm 765 of an elbow lever, the lower depending arm 766 of which is connected with the forward end of a link 767. The rear end of link 767 is provided with a slot 768 which receives a pin 769 at the lower end of the depending arm 763 of the lower triple rock lever.

The shank 758 of the repeating operating key is connected with the rear end of the upper rearwardly projecting arm 770 of an elbow lever, the lower depending arm 771 of which is connected with the rear end of a link 772. The front end of link 772 is provided with a slot 773 which like the slot 768 in link 767, receives the pin 769 on the depending arm 763 of the lower triple rock lever.

Upon depressing the main operating key 753 the same turns the upper triple rock lever, and the rear arm 759 thereof by engaging the lug 762 of the rear arm 761 of the lower triple lever causes the last mentioned lever to also turn in the same direction. While thus depressing the main operating key, the auxiliary and repeating operating keys are not affected because the pin 769 of the lower triple rock lever 763 at this time simply moves idly forward in the slots 768 and 773 of the links 767 and 772. Upon depressing the auxiliary operating key 754 the rear end of the slot 768 in the link 767 engages the pin 769 and turns the lower triple lever in the same direction in which it was moved by the main operating key, without however shifting the latter nor the repeating operating key; since the rear arm 761 of the lower triple lever simply moves downwardly away from the corresponding arm 759 of the upper triple lever, and the pin 769 moves idly forward in the slot 773 of the link 772 of the repeat key 775. Upon depressing the repeating operating key 775 the rear end of the slot 773 in the link 772, by engaging with the pin 769 turns the lower triple lever in the same direction in which it was turned by the main and auxiliary operating keys, but the latter remains at rest or unaffected; owing to the movement of the rear arm 761 of the lower triple lever away from the corresponding arm of the upper triple lever, and the idle movement of the pin 769 in the slot 768 of the link 767. It will thus be noted that the lower triple lever can be moved forwardly by any one of the operating keys without affecting or disturbing either of the other operating keys.

The several operating keys are normally held in an elevated position and the parts connected therewith are retracted by means of springs 774, 775 and 776, connected respectively with the rock arms 759, 765 and 770, as shown in Figs. 3 and 7.

Engaging with the under side of the rear rock arm 761 of the lower triple lever is a forwardly projecting rock arm 777, which is formed integrally or connected with the rock arm 700, which arm is also actuated by the cam 702 of the detent segment 679 as heretofore described.

Upon depressing any one of the operating keys 753, 754 or 755 its movement is transmitted successively by the arms 761, 777 and 700; link 699, rock arms 698 and 697, and releasing bar 694, to the stop dog 690a, withdrawing said stop dog from the shoulder 692 of the stop disk 109, thereby releasing the operating shaft 108 and permitting the machine to perform a cycle of operations by power derived from the spring motor or other source.

The several operating keys 753, 754 and 755 are made of a form to permit each to be depressed by the weight of the hand. The power thus supplied is sufficient to drive the machine through the ordinary full cycle of operations, and is applied to the machine driving spring motor as follows:

A depending rock arm 778 (Fig. 7) is pivoted on the stud 760 and arranged to be engaged by the aforementioned shoulder or lug 764 on the arm 763 of the lower triple rock lever. A rock lever having an upper arm 779 is connected by a link 780 with the depending rock arm 778, and an elbow lever pivoted on the shaft 622 has its lower arm 781 connected by a link 782 with the rock lever arm 783. A pawl 784 arranged on the upper arm 785 of the elbow lever engages with the teeth of the spring winding gear wheel 621, which thus operates also as a ratchet wheel. A spring 786 connected with the link 782 acts to return the parts in their normal position.

It will be noted that by this construction every downward movement of an operating key 753, 754 or 755 is transmitted from the arm 763 successively to the arm 778, link 780, rock lever 779 and 783, link 782, elbow lever 781-785, and pawl 784 to the gear wheel 621; and from the latter to the winding shaft 633 of the spring motor through the medium of the intermediate gearing previously described. The power exerted by the operator in depressing one of the operating keys is thus stored in the motor spring 624 and 625 for use in propelling the operating shaft 108 and the parts driven thereby.

Winding effect of operating keys varied by condition of motor spring

The depending rock arm 778 (Fig. 7) is provided with a slot 787 which is engaged by a roller 788 on the front end of the link 780. A rod 789 is pivotally connected at its upper end to the link 780 and at its lower end to a rearwardly extending arm 790 which is secured to the regulator rock shaft 744.

As heretofore described the regulator shaft 744 turns in a direction to move the rear end of the arm 790 upwardly, and consequently the roller connection 788 of the arm 780 is moved upwardly in the slot 787 of the arm 788 and nearer the pivot 760 of said arm whenever the motor spring 624 and 625 is being wound. Shaft 744 turns in the opposite direction as the motor spring is unwound, and moves the roller 788 downwardly and away from the pivot 760 of the arm 778. Thereby the connection 788 is automatically shifted with relation to the fulcrum 760, and the movement of the link 780 and the pawl 784 and connecting parts on successive operations becomes more or less according to whether the spring is delivering more or less power than it is receiving.

In practice the roller remains very near an average position so that the variation of power required in depressing the operating keys is averaged.

Adjustment of winding by operating keys

Means are provided for regulating approximately the extremities of the adjusting movement of the link 780 in the slotted arm 778.

The means for this purpose shown in Fig. 7 consist in providing the connecting rod 789 at opposite ends with screw threads and engaging the same with swivels 791 and 792 which are pivoted on the link 780 and the rock arm 790, respectively. Upon turning the connecting rod 789 in one direction the range of this adjusting movement of the link will be confined to the upper part of the slot 787. But when the adjusting rod 789 is turned in the opposite direction the roller 788 of the link 780 plays in the lower part of the slot 787.

Should the character of the work require more power than is practical to transmit through the operating keys 753, 754, or 755, then an occasional operation of the operating lever 614 or the winding crank may be resorted to, and in some cases the continual use of the operating lever instead of the operating keys may be required.

Disabling winding of spring motor by operating keys

When the machine is to be operated by an electric motor or other available power it is desirable to disconnect or render inoperative the winding attachment to the operating keys 753, 754 and 755 in order to make them work more easily, and this is accomplished by the following means:—

829 (Fig. 7) represents a push key or stop which passes through an opening in the rear part of the frame. The inner end of this key is guided in the main frames, its front end 830 is in the path of the finger or shoulder 831 on the slotted arm 778. The key 829 is normally forced rearwardly and downwardly by the spring 832 which has one of its ends attached to the key and the other to an eye fixed to the rear part of the frame. The rearward movement of the key is limited by the shoulder or pin 833 thereon coming in contact with the rear of the frame. When the key 829 is in this position the slotted arm 778 is free to move back and forth. The key is also provided with a tooth 835 having an inclined front side and an abrupt rear side.

When it is desired to make the winding of the main spring by the operating keys inoperative, the key 829 is pressed inwardly until the abrupt face of the tooth 835 engages the frame and holds the key in its forward position. This causes the front end of the key lever 830 to engage the finger 831 on the slotted arm 778 and force the latter to its position farthest forward and prevent it from returning by the action of the spring 786, thereby making it inoperative. As long as the key 829 is in this position the operating keys are free to move independently of the winding attachment. When it is again desired to make the latter operative the key is pressed upwardly, which releases it from the rear frame and allows it to move outward by the action of its spring, and the slotted arm 778 is also allowed to move forward into its operative relation to the operating keys by the action of its spring 786.

Power driving mechanism

When electric or other power is obtainable the spring motor may be automatically wound and the machine operated by such power. For this purpose the following mechanism is employed:
793 (Figs. 2, 11, 21 and 24) represents a driven friction drum journaled on the main shaft 108, to one side of this drum is pivoted a ratchet pawl 794 adapted to engage the gear or ratchet wheel 620. Wheel 620 has a hub 795 on its side nearest to the friction drum 793, upon which hub is mounted a spring ring 796 having its opposite ends projecting outwardly one on each side of the tail 797 of the pawl 794. When the drum is driven forwardly the friction of the spring 796 on the hub of the gear ratchet wheel tends to retard the motion of the spring thereby forcing the pawl into engagement with the teeth of the ratchet or gear wheel 620 and coupling the latter with the drum 793.

When however the drum is at rest and the gear ratchet wheel is being rotated the spring forces the pawl 794 out of engagement with the wheel, which is then free to move independent of the pawl and friction drum.

798 represents a driving drum rigidly mounted on a shaft 799. Said shaft is journaled in the main frames b and c (Figs. 2, 3 and 21), passes through the case or cover, and has fixed to its outer end a pulley or belt wheel 800 adapted to transmit power received from an electric or other motor 802 (Fig. 21).

803 represents an intermediate transmitting pulley or drum rotatably mounted on an oscillating frame. Said frame comprises a sleeve 804, loosely mounted on the shaft 805 and having at its opposite ends arms 806 and 807 which support a drum carrying arbor or rod 808.

A spring 809 (Fig. 3) is fixed at one of its ends to the base of the machine while its other end is connected to the arm 806 of the oscillating frame, thereby tending to force the intermediate drum 803 into power transmitting engagement with the driving drum 798 and the driven drum 793.

810 (Fig. 21) represents a spring one end of which is fixed to the regulator arm 748 and the other end to one arm of the elbow lever 811, which latter is pivoted on the stud 812 on the frame b. The other arm 813 of this elbow lever is provided with a fork which engages with a pin 814 on the arm 815 of a shifting frame loosely mounted on the shaft 805. Said frame comprises a sleeve 816 loosely mounted on shaft 805, and having fixed at its outer end the arm 815 and an upwardly extending arm 817. At the inner end of sleeve 816 are secured an upwardly extending arm 818 and a forwardly extending arm 819, said arm 819 having a transversely extending end portion which underlies the arm 806 of the intermediate drum frame.

820 and 821 represent two dogs adapted to engage a pin 822 on the arm 817 of the shifting frame and having depending arms 823 and 824 respectively. The dog 821 is loosely mounted on a shaft 825 and the dog 820 (Fig. 21) is fixed to said shaft 825. The spring 826 (Fig. 22) has one of its ends attached to the dog 820 and its opposite end to the dog 821, and tends to force these dogs into engagement with the pin 822 on the arm 817 of the shifting frame.

836 represents a trip bar which is connected at one of its ends with the regulator arm 748 and is provided on opposite sides of its other end with two tappets 827 and 828, which tappets are adapted to engage respectively with the depending arms 823 and 824 of the dogs 820 and 821.

When the motor spring is fully wound up the tappet 827 engages the depending arm 823 of the dog 820. Assuming that the winding mechanism of the operating keys 753, 754 and 755 has been made inoperative by pushing in the stop or key 829, the motor spring will gradually unwind as the machine is being operated, the intermediate drum 803 being disengaged from the driving and driven drums and no power being transmitted to wind the motor spring.

When the motor spring is sufficiently unwound for the regulator arm 748 to reach its extreme backward position (toward the right of Fig. 21), the front tappet 828 will engage the depending arm 824 of the dog 821 and disengage it from the pin 822, allowing the spring 809 to pull the intermediate drum 803 into engagement with the driving and driven drums 798 and 793. Assuming that drum 798 is in motion, its movement will be transmitted to and will wind motor springs 624 and 625. At the same time the frame 816, 817 and 818 will be swung forward until the pin 822 on its arm 817 is hooked in back of the dog 820. The spring 810 at this time not being strained offers no resistance to this movement of said frame.

As the winding of the main spring proceeds the regulator arm 748 with its bar 836 moves forward or toward the left of Fig. 21, gradually increasing the tension of the spring 810, until it has reached a position in which the rear tappet 827 engages the depending arm of the dog 820 and disengages the latter from the pin 822. The spring 810 at this time is sufficiently strained to overcome the tension of the spring 809, and causes the elbow lever 811 and 813 to turn the shifting frame 815 and 817, moving its arm 817 rearwardly until arrested by the stop 837. By this means the pin 822 is caught by the dog 821, and the arm 819 raises the shifting frame and disengages the intermediate transmitting drum 803 from the driving and driven drums 798 and 793, automatically stopping the operation of winding the main spring until such time as the motor spring is again run down, when the winding mechanism will again become operative in the manner described.

Electric drive 802 (Fig. 21) represents an electric motor which may be either directly connected to the shaft 799 or have its pulley 844 connected by a belt 801 with the pulley 800 on the shaft 799.

This motor is in circuit with an electric generator 845 and two contacts 846 and 847 of a switch for opening and closing said circuit, as shown in Fig. 21.

The contact 847 is insulated and mounted on the frame, and the companion contact 846 is insulated and mounted on the rock arm 818.

When the motor spring is unwound below the normal and the intermediate drum 803 is being engaged with the driving and driven drums the arm 818 moves the contact 846 into engagement with the contact 847, thus operating the electric motor 802 and causing the motor spring to be wound up. When the main spring has been fully wound up and the intermediate drum is disengaged from the driving and driven drums the arm 818 moves the movable contact 846 out of engagement from the stationary contact 847, thus stopping the motor 802 and the further winding of the main spring. The arm 818 being rigidly secured to the sleeve 816 moves with the arms 815 and 817, heretofore described.

Forced winding of motor spring

If at any time it should be desired to fully wind up the motor spring, as for instance when it is desired to fully wind the machine for use after the available power is shut off, this may be accomplished by the following mechanism. 838 (Fig. 22) represents a key or stop provided with an inclined face 839 and with a slot 840 which receives the pin 822. The shank 841 of key 838 passes through an opening in the rear frame of the machine. The spring 842 shown in Fig. 21 tends to pull the key rearwardly.

The dog 821 has a finger 843 extending over the cam 839 of the key 838.

If now it is desired to force the winding of the machine this key 838 is pushed inwardly, whereby its incline 839 lifts the dog 821 and the outer end of its slot 840 comes in contact with the pin 822 and moves it sufficiently to allow it to be locked by the dog 820. At the same time the arm 819 of the shifting frame is forced to move downwardly, allowing the spring 809 to force the intermediate drum 803 into operative contact with the driving and driven drums 798 and 793, and the arm 818 is forced forwardly closing the switch 846 and 847 of the motor 802 and thereby winding the main spring. The key 838 will be immediately returned to its normal position by its spring 842, and the winding will continue until the regulator arm 748 and the trip bar 836 reach their forward position and thereby release the dog 820 from the pin 822, lifting the intermediate drum 803 and opening the electric motor switch.

To prevent injury to the mechanism in the event that the key 838 is held in after the machine is fully wound up, the following mechanism is provided:

848 (Fig. 3) is a stop pawl pivoted on the frame and adapted to engage and stop the gear wheel 620, which gear, as heretofore described, is actuated whenever the motor spring is wound, whether from the electric motor, the operating lever or any of the operating keys. The flat underside of pawl 848 is engaged by a spring 849, by which the pawl is normally held out of engagement with the gear wheel. 850 (Figs. 3, 21 and 23) is a shifting arm which is secured to the rock shaft 825 and terminates in a foot behind and adjacent to the stop pawl 848. As the trip bar 836 moves forward during the winding of the motor spring, and the spring becomes fully wound, the rear tappet 827 in engaging with the depending arm 823 of the dog 820 turns the shaft 825 and the depending arm 850, so that the latter shifts the stop pawl 848 into engagement with the gear wheel 620 and arrests the further winding up of the motor spring. Injury to the spring motor by over-winding is thus prevented, and further, the preventing means becomes effective whether the over-winding is done by the electric motor, the operating lever or any one of the operating keys.

Means for making the machine operative or inoperative

Mounted in bearings on the base near the rear of the machine is a transverse shaft 890 (Fig. 3), to the opposite ends of which are secured a horizontal arm 851 and a vertical arm 852 forming an elbow lever.

The horizontal arm 851 comprises a finger 853 adapted to bear on the releasing bar 694.

A spring 856, one end of which is attached to the vertical arm 852 and the other to the rear end of the frame, tends to normally hold these arms in their retracted position. About midway of the vertical arm 852 is a pin 857 engaging a slot 858 in the front end of a key 859 which passes through an opening in the rear frame. Said key comprises a downwardly extending finger 860 and a detent shoulder 861.

If the key 859 is in its rearward, released or normal position release bar 694 is not affected by the arm 851. But if the key 859 is pressed inwardly or forwardly it will be held in this position by the detent shoulder 861 engaging the rear frame, the vertical arm 852 will be forced forward and the horizontal arm 851 depressed, finger 853 lowering the release bar 694 and depressing the hook 695 thereon below the stop dog foot 696, thereby preventing the release of the machine by any of the operating keys or the operating lever.

Upon releasing the shift key and permitting the same to move rearwardly into its inoperative position the upright and horizontal arms 852 and 851 are retracted, permitting the hook 695 of the release bar 694 to again resume its normal position and enabling the machine to be operated. The upper end of arm 852 may act to disable a part of a machine, such as a computing machine, in the manner described in the parent patent.

Means for locking the machine in the operative or inoperative condition

Mounted on the rear frame of the machine below key 859 is a lock 862 fitted with a lock key 863 and having a locking bolt 864 which may be projected into the path of the finger 860, on the key 859.

The key 859 can be locked either in its operative or inoperative position by engaging the bolt 864 of the lock either with the front or rear side of the finger 861, thereby preventing unauthorized persons from tampering with the machine or interfering with work in progress.

Summary of operation

The operations of the various parts of the machine have been described in detail in connection with the description of the different mechanisms. A general summary of some features of the operation is as follows:

The machine comprises an operating shaft 108 adapted to be driven by a spring motor comprising a plurality of springs connected in series. The spring motor is arranged to be wound up for the storage of power therein from one or more of four different sources, of which the first is a separate winding crank attached to the motor shaft 633 and the gear 627 and winding the spring directly. The other winding means operate through gear 631, which has a pawl and ratchet connection 632 with the winding gear 627, and is driven through gear and pinion train 637, 636, 640, 638 and 621. The operating keys 753, 754 and 755 are each adapted to move the gear 621 an amount depending upon the tension of the motor spring, through the mechanism illustrated in Fig. 7. Gear 621 is also driven by the broad tooth pinion 620 which receives motion through the pawl 623 from the operating handle or lever 614, or from the electric motor through the train of connections shown in Fig. 21.

These connections comprise the driven drum 793 carrying the pawl 794, the intermediate drum 803 and the driving drum 798, the intermediate drum 803 forming a connection between the driving and driven drums and being supported in arms 806—807 for movement to and from effective position. This movement as well as the closing of the motor switch 846—847 is normally controlled by the tension of the motor spring, said spring having associated therewith a regulating arm 748 arranged to be moved in one direction by the winding of the spring and in the reverse direction by the delivery of power from the springs. The parts for giving the regulating arm 748 the necessary movement are illustrated in Figs. 17 to 20 inclusive, and comprise a pair of single tooth pinions, one associated with the motor shaft and the other associated with the power delivering gear 630, and connecting gearing whereby reverse rotation is given to the planetary pinions 749—750 mounted on the regulating arm 748. An indicating pointer 751 is likewise associated with arm 748 to furnish an indication of the condition of the motor springs. The connections for winding the motor spring may also be made by depressing the key 738, but over-winding of the spring by this means is prevented by the engagement of pawl 648 with teeth of pinion 620, said pawl being forced into position to lock the pinion 620 when the motor spring is fully tensioned by the arm 850, which is moved by link 836 associated with the regulating arm 748.

The operating keys and the operating lever release the shaft 108 for rotation by withdrawing latch 691 from the shoulder 692 of the disc 109; the connections for this purpose being shown in Fig. 3 and comprising link 694, lever 697—698, link 699 and arm 700; said arm 700 being moved either by the engagement of roller 701 thereon with the cam 702 on sector 617 or by the engagement of the associated arm 777 with the lever 761, which is adapted to be operated by any of the operating keys. The operating handle is, during its return movement, coupled to the main operating frame so that the power of the handle spring 616 is applied to the operating frame and thus to the main shaft upon the return movement of the handle; the coupling device comprising the member 714 which is moved to and from coupling position by the lever 719 and associated parts (Fig. 3). Said lever is shifted at the end of each stroke of the operating handle. Return movement of the operating handle prior to the completion of the forward movement of the operating frame is prevented by a detent pawl 707 (Fig. 4) controlled by link 709 associated with operating frame (Fig. 3).

Delivery of power from the spring motor is made through a train of connections comprising gears and pinions 630, 642, 645, 644 and 643, pawl 648, scroll gears 646 and 647, the latter being fixed to shaft 108. The scroll gears are arranged to deliver the maximum of power with a minimum of movement as the shaft 108 starts from rest, the torque decreasing and the speed of shaft 108 relative to its driving mechanism increasing as the operation progresses. A governing device is provided which is driven through gears 724 and 725, scroll gears 649 and 650, the latter being secured to the governor shaft 622. The governor performs two functions; first, to return excess power to the motor spring during and after the completion of the operation of shaft 108; and second, the control of a clutch brake. The brake includes the clutch member 674 adapted to engage a conical recess in the hub of pinion 643, and to be moved into such engagement by the thrust of the sleeve 668, said sleeve having incline projections which engage with similar projections on the member 665, which is rotated relative to sleeve 668 by the engagement of projection 664 thereon with the tails 663 of the centrifugal weights 662. The member 657 carrying said weights is driven from the shaft 622 through the planetary pinions 652 carried on arms 654 fixed to the shaft 622. The planetary pinions also engage with the internal gear 656 which is integral with side gear 639 of the differential gearing which drives the gear 636. Thus the planetary pinion 652 will drive the governor or wind the main spring according to the proportionate resistance of these two members to motion, and when the shaft 108 is stopped, the movement of the pinion carrying arm 654 also being stopped, the continued rotation of the governor will drive the main spring until the main spring resists further tensioning with a force greater than that supplied by the momentum of the governor.

The embodiment of the invention herein illustrated and described is to be understood as merely representative of one form of inventions which may assume many other forms, the scope of the invention being limited only by the broad construction of the appended claims.

What is claimed is:

1. In a machine of the character described, the combination of a driven member, means for operating said member, and a driving spring operatively connected with said member and adapted to be wound up by said operating means and to store the surplus power for use in a subsequent operation.

2. In a machine of the character described, the combination of a driven member, means for operating said member comprising a hand lever operatively connected therewith, and a driving spring operatively connected with said member and adapted to be wound up by the movement of said hand lever and to store the surplus power for use in a subsequent operation.

3. In a machine of the character described, the combination of a driven member and mechanism controlled thereby, a driving device operatively connected with said driven member and capable of receiving a greater amount of power than is necessary for driving the machine throughout a single operation, and an operating device correlated with said driving device, for controlling driving movements of the latter and storing more power therein at each operation of said operating device than is necessary for the current operation of the machine.

4. In a machine of the character described, the combination of a driven device, a driving device operatively connected with said driven device and being capable of receiving a greater amount of power than is necessary for driving the machine throughout a single operation, a device for restraining said driving device, and an operating device constructed and arranged for releasing said driving device from the restraining device and for storing more power in said driving device than is necessary for a single operation of the machine.

5. In a machine of the character described, the combination of a driven member, a driving device operatively connected with said driven member and being capable of receiving a greater amount of power than is necessary for driving the machine throughout a single operation, and an operating device correlated with said driving device, for controlling driving movements of the latter and storing therein more power at each of a series of operations of the said operating device than is necessary for driving the machine through a single operation.

6. In a machine of the character described, the combination of a driven member, a driving device correlated with for controlling said driven member and being capable of receiving a greater amount of power than is necessary for driving the machine throughout a single operation, and an operating device correlated with said driving device, for controlling driving movements of the latter and for storing varying amounts of power therein during several operations of the machine.

7. In a machine of the character described, the combination of a driven mechanism, a manipulative control device therefor, a power storing device constructed and arranged to drive said mechanism and to store power received, and means for causing said manipulative device to deliver to said power storing device at each operation of said mechanism, an amount of power which is inversely related to the amount of power stored in said power storing device at the beginning of said operation.

8. In a machine of the character described, the combination of a main driving shaft, a power storing device from which said shaft is driven, an operating key, and means whereby the depression of said operating key causes an addition of power to said storing device.

9. In a machine of the character described, the combination of a main driving shaft, a motor spring from which said shaft is driven, an operating key, and means operatively connecting said key and spring and causing the spring to be wound up upon the depression of the key.

10. In a machine of the character described, the combination of a main driving shaft, a motor spring from which said shaft is driven, an operating key, and means operatively connecting said key and spring and causing the spring to be wound up upon the depression of the key, said means comprising a ratchet wheel operatively connected with the winding end of said spring, a rock lever having a pawl engaging with said ratchet wheel, and a connection between said rock lever and said operating key.

11. In a machine of the character described, the combination of a main driving shaft, a power storing device from which said shaft is driven, an operating key, means which operate to add to the power of said storing device upon depressing said key, and means whereby the effect of said key on said storing device is increased when the power runs down and decreased when the power of said storing device runs up.

12. In a machine of the character described, the combination of a main driving shaft, a power storing device from which said shaft is driven, an operating key, means which operate to add to the power of said storing device upon depressing said key, and means whereby the effect of said key on said storing device is increased when the power runs down and decreased when the power of said storing device runs up, said means comprising a rock arm and bar one of which is operatively connected with said key and the other with said storing device, and a regulating device connected with the storing device and operating to shift said bar toward and from the fulcrum of said arm.

13. In a machine of the character described, the combination of a main driving shaft, a motor spring connected at one end with said driving shaft, a winding device connected with the opposite end of said spring, a regulating arm, means operatively connecting said arm with opposite ends of said spring and operating to move the arm in one direction when the spring unwinds and in the opposite direction when the spring winds up, an operating key, a rock arm connected with said key, a shifting bar movable at one end on said rock arm toward and from the fulcrum thereof, a connection between said regulating arm and said shifting bar, a ratchet wheel operatively connected with the winding end of said spring, and a rock lever operatively connected with said shifting bar and having a pawl engaging with said ratchet wheel.

14. In a machine of the character described, the combination of a main driving shaft, a motor spring connected at one end with said driving shaft, a winding device connected with the opposite end of said spring, a regulating arm, means operatively connecting said arm with opposite ends of said spring and operating to move the arm in one direction when the spring unwinds and in the opposite direction when the spring winds up, an operating key, a rock arm connected with said key, a shifting bar movable at one end on said rock arm toward and from the fulcrum thereof, an adjustable connection between said regulating arm and said shifting bar, a ratchet wheel operatively connected with the winding of said spring, and a rock lever operatively connected with said shifting bar and having a pawl engaging with said ratchet wheel.

15. In a machine of the character described, the combination of a motor, means for releasing the motor, and a plurality of operating keys operatively connected with said releasing means.

16. In a machine of the character described, the combination of a motor, means for releasing the motor, and a plurality of operating keys each capable of operating said releasing means independently of the other keys.

17. In a machine of the character described, the combination of a motor, means for releasing the motor, and a plurality of operating keys arranged to store power in said motor and to operate said releasing means.

18. In a machine of the character described, the combination of a motor spring, means for releasing said spring, and a plurality of operating keys arranged to strain said spring and to operate said releasing means.

19. In a machine of the character described, the combination of a spring motor, a main operating key, an auxiliary operating key, a second auxiliary operating key, a main key lever operatively connected with the main operating key, an intermediate key lever loosely engaged by the main lever, an auxiliary key lever connected with the auxiliary key and loosely connected with the intermediate lever, a lever connected with the second auxiliary operating key and loosely connected with the intermediate lever, means for releasing said motor, and means operatively connecting said intermediate lever with said releasing means and also with said motor for winding the same.

20. In a machine of the character described, the combination of a driven member, a spring for driving said member, a winding device for the spring, a controlling device, and means whereby said spring may be wound simultaneously by the combined pull of the winding and controlling devices or by either of said devices independently of the other.

21. In a machine of the character described, the combination of a driven member, means for operating said member comprising a spring operatively connected at one end with said member, and a hand lever operatively connected with the other end of said spring during its forward movement but disconnected therefrom during its backward movement.

22. In a machine of the character described, the combination of a driven member, means for operating said member comprising a spring operatively connected at one end with said member, a gear wheel operatively connected with the opposite end of said spring, a pinion, a pawl and ratchet connection between said pinion and gear wheel, and a hand lever having a gear segment meshing with said pinion.

23. In a machine of the character described, the combination of a main driving shaft, a power storing device from which said shaft is driven, an operating key, a connection between said operating key and said power storing device whereby power is added to the power storing device upon the depression of the operating key, and means for rendering said connection operative or inoperative.

24. In a machine of the character described, the combination of a main driving shaft, a main driving spring having one of its ends connected with said shaft, a ratchet wheel connected with the other end of said spring, a rock lever having a pawl engaging with the ratchet wheel, an operating key, two rock arms which engage each other loosely and one of which is connected with the operating key and the other with said rock lever, and a push key for separating said rock arms and preventing the action of the operating key from being transmitted to said spring.

25. In a machine of the character described, the combination of an operating mechanism having an operating key and an operating lever, means constructed to permit of setting an oscillating cam connected with said lever, a rock arm connected with said key, a support pivoted on said arm and carrying a roller engaging with said cam and free to move in one direction on the arm but limited in its movement in the opposite direction by a stop shoulder on said arm, and a spring whereby said support is yieldingly held against said stop shoulder.

26. In a machine of the character described, the combination of a main operating lever, a toothed detent member connected with said lever, a pivoted duplex detent pawl having two arms on opposite sides of its center either of which is adapted to engage with said member, a shifting arm arranged centrally on said pawl, and front and rear tappets arranged on said member and adapted to engage alternately with opposite sides of said shifting arm.

27. In a machine of the character described, the combination of a main operating lever, a toothed detent member connected with said lever, a pivoted duplex detent pawl having two arms on opposite sides of its center either of which is adapted to engage with said member, a shifting arm arranged centrally on said pawl, front and rear tappets arranged on said member and adapted to engage alternately with opposite sides of said shifting arm, and a tension device operating to hold said duplex pawl yieldingly in either position.

28. In a machine of the character described, the combination of a main operating lever, a toothed detent member connected with said lever, a pivoted duplex detent pawl having two arms on opposite sides of its center either of which is adapted to engage with said member, a shifting arm arranged centrally on said pawl, front and rear tappets arranged on said member and adapted to engage alternately with opposite sides of said shifting arm, and a tension device operating to hold said duplex pawl yieldingly in either position and consisting of a retaining lug arranged centrally on said pawl, a tension arm, a roller arranged on said tension arm, and a spring operating to turn said tension arm and hold said roller in engagement with either side of said retaining lug.

29. In a machine of the character described, the combination of an operating lever, an operating frame, and means constructed to cause said frame to complete its movement independently of said lever after the latter has effected the initial portion of its forward movement.

30. In a machine of the character described, the combination of an operating lever, an operating frame, means constructed to cause said frame to complete its movement independently of said lever after the lever has effected the initial portion of its forward movement, and means which prevent backward movement of the lever until after the frame has completed its forward movement.

31. In a machine of the character described, the combination of an operating frame having a forward and backward movement, an operating lever, means controlled by said lever for initiating the forward movement of said frame, and means which effect coupling the operating lever with the operating frame during the backward movement of the latter.

32. In a machine of the character described, the combination of an operating frame having a forward and backward movement, an operating lever, and means for coupling the operating lever with the operating frame during the backward movement of the latter which comprise a coupling pawl operatively connected with said lever and adapted to engage a shoulder on said frame.

33. In a machine of the character described, the combination of an operating frame having a forward and backward movement, an operating lever, a movable support operatively connected with said lever, a coupling pawl pivoted on said support, and a pressing device adapted to be engaged with said coupling pawl on either side of its pivot for moving the same into and out of engagement with a shoulder on said frame.

34. In a machine of the character described, the combination of an operating frame having a forward and backward movement, an operating lever having a forward and backward movement, a movable support operatively connected with said lever, a coupling pawl pivoted on said support and having a shoulder adapted to engage with a shoulder on said frame, a presser finger, a spring for pressing said finger against the coupling pawl, a rock lever pivoted on said support and having one of its arms connected with said presser finger, and front and rear stops arranged to be engaged by the other arm of the rock lever at the end of the forward and backward movement of said support for shifting the presser finger from one side of the coupling pawl pivot to the other and to thereby couple or uncouple the operating lever and frame.

35. In a machine of the character described, the combination of a main shaft, a stop disk connected with said shaft and having a shoulder, a stop dog adapted to engage said shoulder, an operating lever, a movable support operatively connected with said lever, a cam arranged on said support, and means whereby said cam is caused to disengage said stop dog from said stop disk.

36. In a machine of the character described, the combination of a main shaft, a stop disk connected with said shaft and having a shoulder, a stop dog adapted to engage said shoulder, an operating lever, a movable support operatively connected with said lever, a cam arranged on said support, and means whereby said cam is caused to disengage said stop dog from said stop disk consisting of a rock arm having a roller engaging said cam, a rock lever having one of its arms connected with said rock arm, and a releasing bar connected with the other arm of said rock lever and having a shoulder adapted to engage with said stop dog and disengage the same from said stop disk.

37. In a machine of the character described, the combination of an operating mechanism having a stop wheel provided with a shoulder, a stop dog adapted to engage with the shoulder of said stop wheel, a releasing bar having a hoop adapted to disengage said dog from said stop shoulder, an elbow lever having one arm adapted to shift said releasing bar into its inoperative position, a shift key having a loose connection with the other arm of the elbow lever, a detent shoulder on said shift key adapted to engage a stationary part of the machine for holding the key in its operative position, and a lock for preventing movement of said shift key.

38. In a machine of the character described, the combination of an operating mechanism having a stop wheel provided with a shoulder, a stop dog adapted to engage with the shoulder of said stop wheel, a releasing bar having a hook adapted to disengage said dog from said stop shoulder, an elbow lever having one arm adapted to shift said releasing bar into its inoperative position, a shift key having a loose connection with the other arm of the elbow lever, and a detent shoulder on said shift key adapted to engage a stationary part of the machine for holding the key in its operative position.

39. In a machine of the character described, the combination of a lever operated shaft provided with coupling lugs, an axial socket, and a radial pocket opening into said socket; a hand lever having coupling lugs adapted to interlock with those of said shaft and a pin adapted to enter said socket and provided on its periphery with a seat, and a spring pressed detent arranged in said pocket and engaging with said seat.

40. In a machine of the character described, the combination of a lever operated shaft provided with coupling lugs, an axial socket, and a radial pocket opening into said socket; a hand lever having coupling lugs adapted to interlock with those of said shaft and a pin adapted to enter said socket and provided on its periphery with an annular groove, a ball arranged in said pocket and engaging with said groove, a spring arranged in said pocket and bearing against said ball, and a cup shaped screw plug arranged in said pocket and bearing against said spring, the inner end of said pocket being contracted to a diameter less than the diameter of said ball and the inner end of said pin being tapered.

41. In a machine of the character described, the combination of a main shaft, a main power spring having one end operatively connected with said shaft for driving the same, a winding device connected with the other end of said spring, a member capable of moving forward and backward, and means including planetary gearing operatively connecting said member with opposite ends of said spring and operating to cause said member to move in one direction when the spring is being wound up and to move in the opposite direction when the spring is unwinding.

42. In a machine of the character described, the combination of a main shaft, a main power spring having one end operatively connected with said shaft for driving the same, a winding device connected with the other end of said spring, a rock arm, two planetary gear pinions meshing with each other, two master gear wheels meshing respectively with said pinions, and intermediate mechanism operatively connecting said gear wheels with opposite ends of said spring and operating to turn said gear wheels in opposite directions.

43. In a machine of the character described, the combination of a main driving shaft, a main power spring having one end operatively connected with said shaft, a winding device connected with the opposite end of said spring, a rock arm, intermeshing planetary pinions mounted on said rock arm, two master gear wheels meshing respectively with said pinions, two single tooth pinions operatively connected with opposite ends of said spring, two intermittent gear wheels meshing respectively with said single tooth pinions, a pinion secured to one of said intermittent gear wheels and meshing directly with one of said master gear wheels, a pinion secured to the other intermittent gear wheel, and an intermediate pinion meshing with said last mentioned pinion and also meshing with the other master gear wheel.

44. In a machine of the character described, the combination of actuating means, a power storing device for operating said actuating means, a motor for applying power to said power storing device but normally disconnected therefrom, and a clutch automatically operable to connect said motor and power storing device when the power in said storing device is below a predetermined amount and to disconnect said motor and power storing device when the power in said storing device is above a predetermined amount.

45. In a machine of the character described, the combination of a main driving shaft, a main spring having one end operatively connected with said shaft, an electric motor operatively connected with the opposite end of the spring, a switch for controlling said motor, a pivoted regulating arm connected with said switch; and means connecting said regulating arm with opposite ends of said spring and operating to turn said arm on its pivot in one direction for opening said switch when said spring winds above normal, and in the opposite direction for closing said switch when the spring unwinds below normal.

46. In a machine of the character described, the combination of a main driving shaft, a main spring having one end operatively connected with said shaft, an electric motor operatively connected with the opposite end of the spring, a switch for controlling said motor, a trip arm operatively connected with the movable contact of the switch and having a pin or shoulder, a dog adapted to engage said pin, a bar having a tappet adapted to shift said dog, a regulating arm connected with said bar, two springs which operate to draw said trip arm in opposite directions, one being connected with said regulating arm and the other with a stationary support, and means operatively connecting said regulating arm with opposite ends of said main spring and operating to turn said regulating arm in one direction when the main spring unwinds and in the opposite direction when the main spring winds up.

47. In a machine of the character described, the combination of a main driving shaft, a main spring having one end operatively connected with said shaft, an electric motor operatively connected with the opposite end of the spring, a switch for controlling said motor, a trip arm operatively connected with the movable contact of the switch and having a pin or shoulder, a pair of dogs one of which is adapted to hold the trip arm in one position and the other in another position and each having a shifting arm, a shifting bar having two tappets one for engaging the shifting arm of one dog and the other for engaging the shifting arm of the other dog, a regulating arm, two springs which operate to pull said trip arm in opposite directions and one of which connects with the regulating arm and the other with a stationary part, and means operatively connecting said regulating arm with opposite ends of the main spring and operating to turn said regulating arm in one direction when the main spring unwinds and in the opposite direction when the main spring winds up.

48. In a machine of the character described, the combination of a main driving shaft, a main spring from which said shaft is driven, a winding device geared to said spring, an element movable in accordance with the tensioning of said spring, and means controlled by said element for blocking the movement of said winding gearing when said spring is wound above normal.

49. In a machine of the character described, the combination of a main operating shaft, a spring motor, and a transmitting mechanism interposed between said motor and shaft and constructed to drive the latter with the greatest power at the beginning of each operation and to gradually reduce the power to a minimum at the end of each operation.

50. In a machine of the character described, the combination of a main operating shaft, a spring motor, and a transmitting mechanism interposed between said motor and said shaft comprising a pair of intermeshing scroll gear wheels which are constructed to drive the operating shaft with the greatest power at the beginning of each operation and to drive the same with the least power at the end of each operation.

51. In a machine of the character described, the combination of a main operating shaft, a power storing device operatively connected with said shaft, an initial actuating mechanism, and a differential gearing interposed between said shaft, said power storing device and said initial actuating mechanism.

52. In a machine of the character described, the combination of an operating shaft, an initial actuating device, a power storing spring connected at one end with the operating shaft, a differential gearing interposed between the initial actuating device and the other end of said spring, a fly wheel; and a planetary gearing having gear wheels connected, respectively, with said differential gearing and said fly wheel, pinions meshing on opposite sides with said gear wheels, and a rotary support carrying said pinions and operatively connected with said operating shaft.

53. In a machine of the character described, the combination of a main driving shaft, a power storing device for effecting actuation of said driving shaft, a motor for delivering power to said power storing device, a clutch for connecting said motor and said power storing device, and mechanism controllable by said power storing device for automatically rendering said clutch effective and ineffective.

54. In a machine of the character described, the combination of a main driving shaft, a power storing device correlated with and for controlling said main driving shaft, a motor controllable by said power storing device for delivering power to said power storing device, and means operable independently of said power storing device for controlling said motor.

55. In a machine of the character described, the combination of a main driving shaft, a power storing device correlated with and for controlling said driving shaft, a motor controllable by said power storing device for delivering power to said power storing device, and a key for controlling said motor.

56. In a machine of the character described, the combination of a main driving shaft, an electric circuit correlated with and for supplying motive power for said main driving shaft, means comprising a switch correlated with said main driving shaft and automatically operable for breaking and closing said electric circuit, and a device for operating said switch to close said electric circuit at the will of the operator.

57. In a machine of the character described, the combination of a main driving shaft, a main spring from which said shaft is driven, a driven drum operatively connected with said spring for winding the same, a motor operated driving drum, an intermediate drum, and means controlled by the winding and unwinding of said spring and operating to move said intermediate drum into and out of engagement with said driving and driven drums.

58. In a machine of the character described, the combination of a main driving shaft, a main spring from which said shaft is driven, a driven drum operatively connected with said spring for winding the same, a driving drum, an electric motor for operating the driving drum, an intermediate drum, a rocking support for moving the intermediate drum into and out of engagement with the driving and driven drums, a trip arm moving with said support and having a pin, two trip dogs adapted to engage alternately with said pin and hold the trip arm either in its operative or inoperative position, a regulating arm, means operatively connecting the regulating arm with opposite ends of the main spring and operating to move this arm in one direction when the main spring unwinds and in the opposite direction when the main spring winds up, and two springs operating to pull said trip arm in opposite directions one connecting with the regulating arm and the other with a stationary part.

59. In a machine of the character described, the combination of a main driving shaft, a main spring from which said shaft is driven, a driven drum operatively connected with said spring for winding the same, a driving drum, an electric motor for operating the driving drum, an intermediate drum, a rocking support for moving the intermediate drum into and out of engagement with the driving and driven drums, a trip arm moving with said support and having a pin, two trip dogs adapted to engage alternately with said pin and hold the trip arm either in its operative or inoperative position, a regulating arm, means operatively connecting the regulating arm with opposite ends of the main spring and operating to move this arm in one direction when the main spring unwinds and in the opposite direction when the main spring winds up, two springs operating to pull said trip arm in opposite directions one connecting with the regulating arm and the other with a stationary part, and a key operating to disengage one of the dogs from the pin of the trip arm and cause the intermediate drum to assume its operative position independently of the position of the regulating arm.

60. In a machine of the character described, the combination of a main driving shaft, a main spring from which said shaft is driven, a driven drum operatively connected with said spring for winding the same, a driving drum, an electric motor for operating the driving drum, an intermediate drum, a rocking support for moving the intermediate drum into and out of engagement with the driving and driven drums, a trip arm moving with said support and having a pin, two trip dogs adapted to engage alternately with said pin and hold the trip arm either in its operative or inoperative position, a regulating arm, means operatively connecting the regulating arm with opposite ends of the main spring and operating to move this arm in one direction when the main spring unwinds and in the opposite direction when the main spring winds up, two springs operating to pull said trip arm in opposite directions one connecting with the regulating arm and the other with a stationary part, and a switch for controlling said motor having one of its contacts moving with the trip arm.

61. In a machine of the character described, the combination of a main driving shaft, a main spring from which said shaft is driven, a driven drum operatively connected with said spring for winding the same, a driving drum, an electric motor for operating the driving drum, an intermediate drum, a rocking support for moving the intermediate drum into and out of engagement with the driving and driven drums, a trip arm moving with said support and having a pin, two trip dogs adapted to engage alternately with said pin and hold the trip arm either in its operative or inoperative position, a regulating arm, means operatively connecting the regulating arm with opposite ends of the main spring and operating to move this arm in one direction when the main spring unwinds and in the opposite direction when the main spring winds up, two springs operating to pull said trip arm in opposite directions one connecting with the regulating arm and the other with a stationary part, a gear wheel operatively connected with the winding end of the main spring, a stop dog, and a shifting arm operatively connected with one of said trip dogs and adapted to move said stop dog into engagement with said gear wheel for arresting the winding up of the said main spring.

62. In a machine of the character described, the combination of a driven member; means for operating said member comprising a plurality of coil springs, the inner end of one spring being connected with the outer end of the other spring; two gear wheels arranged adjacent to said springs; a winding device; a ratchet device connecting the winding device with one of said gear wheels; and a transmitting device connecting the other gear wheel with said member.

63. In a machine of the character described, the combinaton of a drven member; means for operating said member comprising a plurality of coil springs, the inner end of one spring being connected with the outer end of the other spring; two gear wheels arranged adjacent to said springs; a winding device; a ratchet device connecting the winding device with one of said gear wheels; a transmitting device connecting the other gear wheel with said member; and a common shaft upon which said springs, gear wheels and ratchet device are mounted.

64. A machine comprising in combination, a driven member, a spring for driving said member and being capable of receiving and sending out at each operation of the machine more power than is consumed in operating said member, and a device correlated with said spring and being capable of turning back into said spring the unconsumed power sent out by said spring.

65. In a machine of the character described, the combination of a driven member, a spring for driving said member, a controlling device having a rotatable member, and means for connecting said rotatable member with said driven member whereby the motion of said driven member is transmitted to said controlling device but said device is capable of independent movement when said driven member is arrested.

66. In a machine of the character described, the combination of a driven mechanism, and a power storing device constructed and arranged to drive said mechanism and to receive therefrom different amounts of power at different operations of said machine.

67. In a machine of the character described, the combination of a driven mechanism, a power storing device constructed and arranged to drive said mechanism, and means for causing different amounts of power to be stored in said power storing device at different operations of the machine.

68. In a machine of the character described, the combination of a driven mechanism, a spring for driving said mechanism, and mechanism operable by said spring which controls the speed of operation of said driven mechanism and partially retensions said spring.

69. In a machine of the character described, the combination of a driven mechanism, a spring for driving said mechanism, and mechanism operable by said spring which controls the speed of operation of the driven mechanism and partially retensions said spring between said successive operations of the machine.

70. In a machine of the character described, the combination of a driven mechanism, a spring for driving said mechanism, and mechanism operable by said spring which controls the speed of operation of said driven mechanism and partially retensions said spring after an operation of the driven mechanism and which may cease to retension said spring after said operation but otherwise cooperates with said spring in controlling a subsequent operation of said driven mechanism.

71. The combination of a driven mechanism, a spring correlated with for driving said driven mechanism, a device correlated with for controlling driving movements of said spring, a fly wheel correlated with for storing power in said spring, and a hand-actuated operation-controlling member for controlling operation of the said device.

72. The combination of an intermittently operating mechanism, a motor for driving said mechanism, a controlling device comprising a rotary member, and means for operatively connecting said rotary member with said mechanism so that the latter may be propelled by said rotary member, the rotary member being capable of rotation without propelling said mechanism during the intermissions of movement of the latter.

73. In a machine of the character described, the combination of a driven member, means for operating said member comprising a spring, and a rotatable member which is set in motion during each operation of the machine and whose momentum is caused to wind said spring.

74. In a machine of the character described, the combination of a driven member, means for operating said member comprising a hand lever operatively connected with said member, a driving spring operatively connected with said member and adapted to be wound up by the movement of said hand lever, and a controlling device having a rotatable member which is set in motion during each operation of the machine and whose momentum is caused to wind said spring.

75. In a machine of the character described, the combination of an operating means, a power storing device adapted to deliver power to said operating means, and means operable by said operating means to return to said power storing device a portion of the power received therefrom at each operation of said machine.

76. In a machine of the character described, the combination of an operating means, driving means for said operating means, and a governing device for controlling said operating means constructed and arranged to return to said driving means a portion of the power which said governing device receives from said driving means at each operation of said machine.

77. In a machine of the character described, the combination of a driven shaft; a spring for driving said shaft; and power transmitting and reducing means connecting said spring with said driven shaft, by which means the power applied to said shaft is decreased, as the said shaft is driven by said spring, at a greater rate of decrease than the rate of decrease of the spring's power while said spring is being untensioned in driving said shaft.

78. In a machine of the character described, the combination of an operating means, a power storing device, and connections from said power storing device to said operating means constructed and arranged to deliver a large amount of power to said operating means during the early part of each operation of the machine, and to deliver gradually decreased amounts of power as the operation progresses.

79. In a machine of the character described, the combination of a transmission shaft, a motor whereby said shaft is driven, a driving gear member operatively connected with said motor, and a driven gear member operatively connected with said shaft and operable by said driving gear member, said gear members being so constructed that the relative speeds thereof are automatically changed during different parts of the operation of the machine.

80. In a machine of the character described, the combination of a transmission member, a motor whereby said transmission member is driven, and means for automatically increasing the power delivered to said transmission member without affecting the normal operation of said motor.

81. In a machine of the character described, the combination of a transmission member, a motor whereby said transmission member is driven; means for automatically increasing the power delivered to said transmission member without affecting the normal operation of said motor; a driving gear member operatively connected with said motor; and a driven gear member operatively connected to said transmission member and operable by said driving gear member, said gear members being so constructed that the relative speeds thereof are automatically changed during different parts of the operation of the machine.

82. In a machine of the character described, the combination of a main operating shaft, an actuator, and a transmitting mechanism between said actuator and said operating shaft constructed to drive the latter with the greatest power at the beginning of each operation and to gradually reduce the power to a minimum at the end of the operation.

83. In a machine of the character described, the combination of a main operating shaft, a motor, and motion transmitting means between said motor and said shaft whereby the speed of said shaft relative to said motor is automatically and gradually varied according to the angular position of said shaft.

84. In a machine of the character described, the combination of a main operating shaft, a spring power storing device operatively connected at one end with said shaft, an initial actuating mechanism, and a differential gearing interposed between said initial actuating mechanism, the operating shaft and the other end of said power storing device.

85. In a machine of the character described, the combination of a main operating shaft, an initial actuating mechanism, a power storing spring operatively connected at one end with said shaft; and a differential gearing having two side gear wheels which are operatively connected with the initial actuating mechanism and said operating shaft respectively, an intermediate gear wheel operatively connected with the opposite end of said spring, and pinions journaled on said intermediate gear wheel and each meshing on opposite sides with said side gear wheels.

86. In a machine of the character described, the combination of an operating shaft, an initial actuating device, a power storing spring connected at one end with the operating shaft, a differential gearing interposed between the initial actuating device and the other end of said spring, and a planetary gearing interposed between said operating shaft and said differential gearing.

87. In a machine of the character described, the combination of an operating shaft, an initial actuating device, a power storing spring connected at one end with the operating shaft; a differential gearing consisting of two side gear wheels one of which is operatively connected with said initial actuating device, an intermediate gear wheel operatively connected with the other end of the spring, and pinions mounted on the intermediate gear wheel and meshing with the side gear wheels; a fly wheel; and a planetary gearing consisting of an outer gear wheel connected with the other side gear wheel of the differential gearing, an inner gear wheel connected with the fly wheel, pinions meshing with the inner and outer gear wheel, and a rotary support carrying the last mentioned pinions and operatively connected with said shaft.

88. In a machine of the character described, the combination of a main operating shaft, a motor, means for transmitting motion from said motor to said shaft, a fly wheel operatively connected with said shaft, an automatic clutch associated with said motion transmitting means and having two jaws one of which is movable toward and from the other, and centrifugal weights mounted on said wheel and operatively connected with said movable clutch jaw.

89. In a machine of the character described, the combination of a main operating shaft, a motor, means for transmitting motion from said motor to said shaft; and an automatic clutch associated with said motion transmitting means comprising two coupling jaws one movable toward and from the other, an axially movable sleeve engaging said movable clutch jaw, a rotary shifting sleeve having inclined faces engaging similar faces on the axially movable sleeve, a fly wheel, and centrifugal weights pivoted on the fly wheel and engaging with lugs or shoulders on the rotary shifting sleeve.

90. In a machine of the character described, the combination of a main operating shaft, a motor spring operatively connected with the shaft, a fly wheel operatively connected with said spring and adapted by its momentum to partially wind said spring, and means operatively connecting said shaft and fly wheel and constructed to rotate the latter with a slow speed at the beginning of each operation and with a high speed at the end of each operation.

91. In a machine of the character described, the combination of a main operating shaft, a motor spring operatively connected with the shaft, a fly wheel operatively connected with said spring and adapted by its momentum to partially wind said spring, and a transmitting mechanism connecting said shaft and fly wheel whereby the speed of the fly wheel relative to the shaft is automatically varied.

92. In a machine of the character described, the combination of a main driving shaft, a power storing device from which said shaft is driven, an electric motor for operating said storing device, a switch which controls said motor, means normally maintaining said switch open and the contact points thereof relatively fixed, and means whereby said switch is closed with a snap action when the power in said storing device runs below a predetermined amount.

93. In a machine of the character described, the combination of a main driving shaft, a power storing device from which said shaft is driven, an electric motor for operating said storing device, a switch which controls said motor, means normally maintaining said switch open and the contact points thereof relatively fixed, means whereby said switch is closed with a snap action when the power in said storing device runs below a predetermined amount, and means whereby said switch is opened with a snap action when the power in said storing device exceeds a predetermined amount.

94. In a machine of the character described, the combination of a main operating shaft, a motor, means for transmitting motion from said motor to said shaft comprising a one-way connection, a clutch associated with said motion transmitting means, and means for actuating said clutch to stop said motor when a predetermined amount of power has been delivered thereby to said shaft.

WILLIAM S. GUBELMANN.